United States Patent
Scott et al.

(10) Patent No.: US 8,500,102 B2
(45) Date of Patent: Aug. 6, 2013

(54) RETRACTABLE JACK FOOT

(75) Inventors: Gary M. Scott, Milwaukie, OR (US); Joshua A. Jones, Lindon, UT (US); Jed Anderson, Lindon, UT (US)

(73) Assignee: Progress Mfg. Inc., Provo, UT (US)

( * ) Notice: Subject to any disclaimer, the term of this patent is extended or adjusted under 35 U.S.C. 154(b) by 1176 days.

(21) Appl. No.: 12/335,498

(22) Filed: Dec. 15, 2008

(65) Prior Publication Data

US 2009/0159863 A1 Jun. 25, 2009

Related U.S. Application Data

(63) Continuation-in-part of application No. 12/240,908, filed on Sep. 29, 2008, now abandoned.

(60) Provisional application No. 60/997,272, filed on Oct. 1, 2007, provisional application No. 60/995,744, filed on Sep. 28, 2007.

(51) Int. Cl.
*B60S 9/00* (2006.01)
*B60S 9/02* (2006.01)
*B66F 7/22* (2006.01)
*B60D 1/66* (2006.01)

(52) U.S. Cl.
USPC .......... 254/420; 254/94; 254/423; 280/763.1; 280/475

(58) Field of Classification Search
USPC ............ 254/420, 94, 423, 133 R; 280/763.1, 280/43.18, 475, 477, 455.1, 6.153, 766.1
See application file for complete search history.

(56) References Cited

U.S. PATENT DOCUMENTS

| | | | |
|---|---|---|---|
| 2,196,510 A | 4/1940 | Vutz | |
| 2,672,318 A | 3/1954 | Lee | |
| 2,683,277 A * | 7/1954 | Bernaerts | 16/18 R |
| 2,784,985 A | 3/1957 | Schnell | |
| 2,865,658 A | 12/1958 | Duguque | |
| 3,150,884 A * | 9/1964 | Drott | 280/460.1 |
| 3,281,160 A * | 10/1966 | Vinther et al. | 254/420 |
| 3,841,663 A | 10/1974 | Proffit | |
| 3,863,894 A | 2/1975 | Mansi et al. | |
| 3,934,852 A | 1/1976 | Weber et al. | |
| 3,944,259 A * | 3/1976 | Miller | 280/475 |
| 3,951,383 A * | 4/1976 | Tenney, Jr. | 254/94 |
| 3,964,767 A * | 6/1976 | Williams | 280/455.1 |
| 4,030,775 A * | 6/1977 | Hill | 280/477 |
| 4,057,266 A * | 11/1977 | Duncan et al. | 280/475 |
| 4,136,891 A | 1/1979 | Menzel | |

(Continued)

*Primary Examiner* — Lee D Wilson
*Assistant Examiner* — Alvin Grant
(74) *Attorney, Agent, or Firm* — Clayton, Howarth & Cannon, P.C.

(57) ABSTRACT

A retractable jack foot for a trailer hitch jack is disclosed, for rapidly raising and lowering the tongue of a trailer. The retractable jack foot solves multiple prior art problems discussed above in the "Description of Related Art," such as: trailer hitch jacks not being long enough to reach the ground and still lift the trailer to a sufficient height (small distance travel); the laborious, time-consuming practice of cranking a trailer hitch jack all the way to the ground before finally causing lift in the trailer. In both cases, blocks of wood or other spacers are sometimes used to reduce the travel of the jack. The retractable jack foot of the present disclosure, solves those problems, by providing a "built in" block, or foot, pivotally attached to the bottom of the trailer hitch jack. The jack foot can be rotated into and out of position as desired, to quickly lengthen or shorten the jack.

17 Claims, 26 Drawing Sheets

U.S. PATENT DOCUMENTS

| | | | |
|---|---|---|---|
| 4,605,086 A * | 8/1986 | Marom | 180/202 |
| 4,662,610 A * | 5/1987 | Cofer | 254/420 |
| 4,711,428 A * | 12/1987 | Carpenter | 254/423 |
| 4,815,711 A * | 3/1989 | Bruno et al. | 254/423 |
| 4,824,136 A * | 4/1989 | Bobby | 280/475 |
| 5,087,063 A | 2/1992 | Merrill, Jr. | |
| 5,161,815 A * | 11/1992 | Penor, Jr. | 280/477 |
| 5,213,354 A * | 5/1993 | Vaughn | 280/479.2 |
| 5,354,087 A * | 10/1994 | Head | 280/490.1 |
| 5,451,080 A * | 9/1995 | Kneile | 248/354.1 |
| 5,503,423 A * | 4/1996 | Roberts et al. | 280/491.3 |
| 5,915,672 A * | 6/1999 | Dickey | 254/133 R |
| 6,311,954 B1 * | 11/2001 | Breslin et al. | 254/420 |
| 6,726,236 B2 * | 4/2004 | Cofer | 280/475 |
| 6,726,247 B1 | 4/2004 | Snyder | |
| 6,739,601 B1 | 5/2004 | Fine | |
| 6,948,722 B2 * | 9/2005 | Sproatt et al. | 280/6.153 |
| 7,025,556 B1 * | 4/2006 | Koffman et al. | 414/346 |
| 7,128,340 B1 * | 10/2006 | Alguera Gallego et al. | 280/763.1 |
| 7,261,304 B2 * | 8/2007 | Trudeau et al. | 280/6.153 |
| 7,425,012 B1 * | 9/2008 | Sease | 280/475 |
| D636,297 S * | 4/2011 | Wu et al. | D12/106 |
| 7,950,678 B1 * | 5/2011 | Bauder | 280/43.18 |
| 2003/0020270 A1 * | 1/2003 | Cofer | 280/763.1 |
| 2006/0043695 A1 * | 3/2006 | Wilson | 280/475 |
| 2006/0081739 A1 | 4/2006 | Meissner | |
| 2006/0214147 A1 | 9/2006 | Meissner | |
| 2009/0200824 A1 * | 8/2009 | Garceau | 296/26.13 |

\* cited by examiner

RETRACTABLE JACK FOOT

CROSS-REFERENCE TO RELATED APPLICATIONS

This application is a continuation in part of co-pending U.S. patent application Ser. No. 12/240,908, filed Sep. 29, 2008, entitled "RETRACTABLE JACK FOOT," which claims the benefit of both of the following two (2) applications: 1) U.S. Provisional Application No. 60/997,272, filed Oct. 1, 2007; and 2) U.S. Provisional Application No. 60/995,744, filed Sep. 28, 2007, wherein all of the foregoing are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

BACKGROUND OF THE INVENTION

1. The Field of the Invention

The present disclosure relates generally to trailer hitch systems, and more particularly, but not necessarily entirely, to trailer hitch systems that facilitate connecting trailers to tow vehicles.

The present invention relates generally to a jack stand and methods of making and using same. In particular, but not by way of limitation, the present invention relates to a jack stand having a means for moving the foot assembly of the jack stand from a ground engaging configuration to an upright stored configuration.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a ball mount mounted on the towing vehicle using a threaded receiver or ball hitch fitting. A trailer coupling member, such as a ball clamp, positioned on a front of the trailer tongue, may engage the ball hitch in a loose friction fit, and may be secured to the ball in preparation for towing. Some hitches may also have load equalizing systems to distribute loads and allow the towing vehicle and trailer to remain level. Other mechanisms may also be used in association with a trailer hitch to reduce side sway of the trailer. Most trailers include a jacking system for assisting in hitching and leveling to a tow vehicle.

A common challenge with the known trailer hitch systems is attaching the trailer to the tow vehicle. Difficulty may arise in properly aligning the trailer vertically with the tow vehicle. Commonly a jacking device is used to align the trailer hitch and tow vehicle by raising a lowering the tongue of the trailer. The jacking device after use must be stowed out of the way so the driving can be done safely. Along unimproved roads, the distance required for the trailer jack to clear any such obstacles would often be extensive or not quite enough leading to situations where the trailer tongue would become lodged in the ground rendering any movement futile. Most commonly this stowing is done by continuing the jacking process to pull the foot up and out of the way. This can take a great amount of time effort.

There have been many attempts to improve the method of aligning trailers to tow vehicles, yet the most common method remains the conventional jack attached at the tongue, even though such a method has several drawbacks. The tongue of a two-wheel (or a trailer having any number of wheels or axles) trailer is conventionally provided with a jack having a telescoping vertical element which extends below the plane of the trailer tongue. One of the drawbacks of the conventional jack system and jacking method may include the many number of movements needed to take advantage of the mechanical properties to the jacking design. Many turns may be needed to raise and lower the tongue, or to level the trailer for use. These many turns must be repeated every time the trailer is connected or disconnected.

Other trailer hitch systems may use a jack that is geared to move faster. In other words one actuation of the jack lever raises and lowers the trailer tongue more per actuation than a jack system designed to handle a very heavy trailer.

Another jacking system may be designed to handle a very heavy weight and therefore is generally slow, using the mechanical advantage of the design to over come the heavy load. In such a system many actuations are required to move the trailer a very short distance.

Referring now to FIG. 1, a side view of a trailer 10 and towing vehicle 20 system is shown.

The trailer 10 and towing vehicle 20 may include a ball hitch 12 for attaching to a ball socket 14 on a tongue 16 of the trailer 10 in a manner known in the art. It will be understood that the trailer 10 and towing vehicle 20 system may be made more convenient, as explained more fully below, to allow the ball hitch 12 to be aligned more easily and faster with the socket 14 on tongue 16 when the trailer 10 is detached and attached to and from the towing vehicle 20.

A jack 18 may be used on the tongue 16 to raise and lower the tongue 16 of the trailer 10 to aid in the hitching of the tow vehicle 20 with the trailer 10. A jack 18 is generally made up of an actuation portion 22, a post portion 24 and a foot portion 26. The actuation portion 22 may comprise a user interface which is commonly a handle or crank of some kind. In the case of a handle and crank, the user would take the handle in its hand and rotate the crank in a circular motion. The force applied by the user is multiplied by the mechanical advantage of the jacking mechanism. An electric motor may also be employed to actuate the jack mechanism. An electric motor may be configured to run at the optimal speed for a balance of speed and power. In the case of a trailer the mechanical mechanism of the jack requires a great amount of motion at the handle and produces a small amount of motion at the post portion 24 or foot portions 26. The post portion 24 rigidly fixes the foot portion 26 to the drive mechanism or the jack 18. The foot portion 26 generally makes contact with the ground and is typically wider than the post portion 24 to distribute the weight of the trailer 10.

In use, the tow vehicle may be positioned near the trailer such that the ball 12 on the vehicle 20 is located under the ball socket 14 of the trailer 10. As is shown in FIG. 2, the ball socket 14 may be lowered over ball 12 by actuating the jack 18 with the crank handle 22, thereby retracting upwardly the jack post 24 and jack foot 26, which, in turn, allows the tongue 16 (and ball socket 14) to lower under force of gravity. As the ball 12 makes contact inside the ball socket 14, the weight of the trailer 10 is transferred from the jack foot 26 to the vehicle 20.

With reference now to FIG. 3, one of the shortcomings of the prior art will be discussed. In order to make the trailer 20 ready for towing, the jack foot 26 must be raised up and out of the way so that it does not contact the ground during travel. FIG. 3 depicts the jack foot 26 raised in the upper-most position. With the trailer's weight resting on the vehicle, the mechanical advantage of the jack makes for a tedious and time consuming process in raising the jack foot high enough to be out of the way of ground contact risk.

Illustrated in FIG. 4 is a typical mechanical jack 18. The mechanics of the jack may be of a screw type, step-lever type, or any other typed known in the art. For illustration purposes, a screw-type jack will be discussed. A screw-type jack derives its usefulness by using the ramping of the threads 40 on a drive axle 41 against corresponding structures on a ram or jack post 24 to move the jack post 24 in or out. In use, an operator would grasp the crank handle 22 and turn the crank 23 about the axis of the drive axle 41. The crank 23 can be easily replaced by an electric motor that would then drive the drive axle 41. Depending on the direction of the rotation of the crank 23, the jack post 24 will either raise or lower. The mechanical exchange in such machines is an inverse relationship between power and distance. Accordingly, the typical jack used on a trailer needs to convert low input power but large distance travel at the handle into high output power, but small distance travel at the jack post to move the heavy weight of a trailer. Therefore, even after the weight of the trailer is resting on the vehicle, continuing to move the jack foot up and out of the way of ground contact risk takes a lot of motion and time.

Often people use blocks of wood 50 or other material to place under the jack foot 26, as seen in FIG. 5, such that in use, the blocks can be quickly removed and thereby negate the need to move the jack 18 some distance where its mechanical advantage is not needed. The blocks however need to be stored when not in use, and are unsightly when in use or being stored.

At the end of this telescoping jack post is typically found a "foot" which rests on the ground to support and/or level the forward end of the trailer. In order for the trailer jack to be out of the way during towing, it has been traditional for the entirety of the trailer jack to be pivoted such that the trailer jack was in a substantially horizontal alignment with the trailer tongue when the trailer was attached to a towing vehicle. During road travel the foot would have to be elevated a considerable distance off of the ground in order for the trailer jack to clear any obstacles or uneven areas in the road to be traveled.

Either of the above-mentioned means for moving the trailer jack sufficiently out of the way of ground contact risk during transport require significant physical exertion on the part of the operator. If the trailer jack is pivoted into a horizontal position, oftentimes the pins and springs used during the pivoting process have been corroded or rusted by exposure to the weather. If these items have frozen in place, the operator has no choice but to expend considerable effort to free them in order to move the trailer jack into the horizontal position. If the trailer jack is elevated to a height sufficient to clear obstacles in the road, the elevation must be quite extensive in order to clear all potential obstacles. Additionally, the operator must exert extensive effort to ensure that the elevation is accomplished while the mechanical means for elevating the trailer hitch are oftentimes rusted and/or frozen.

The prior art is characterized by these and other disadvantages that are addressed by the present disclosure. The present disclosure minimizes, and in some aspects eliminates, the above-mentioned failures, and other problems, by utilizing the methods and structural features described herein.

BRIEF SUMMARY OF THE DISCLOSURE

A retractable jack foot for a trailer hitch jack is disclosed, for rapidly raising and lowering the tongue of a trailer. The retractable jack foot solves multiple prior art problems discussed above in the "Description of Related Art," such as: trailer hitch jacks not being long enough to reach the ground and still lift the trailer to a sufficient height; the laborious, time-consuming practice of cranking a trailer hitch jack all the way to the ground before finally causing lift in the trailer. In both cases, blocks of wood or other spacers are sometimes used to reduce the travel of the jack. The retractable jack foot of the present disclosure, solves those problems, by providing a "built in" block, or foot, pivotally attached to the bottom of the trailer hitch jack. The jack foot can be rotated into and out of position as desired, to quickly lengthen or shorten the jack.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
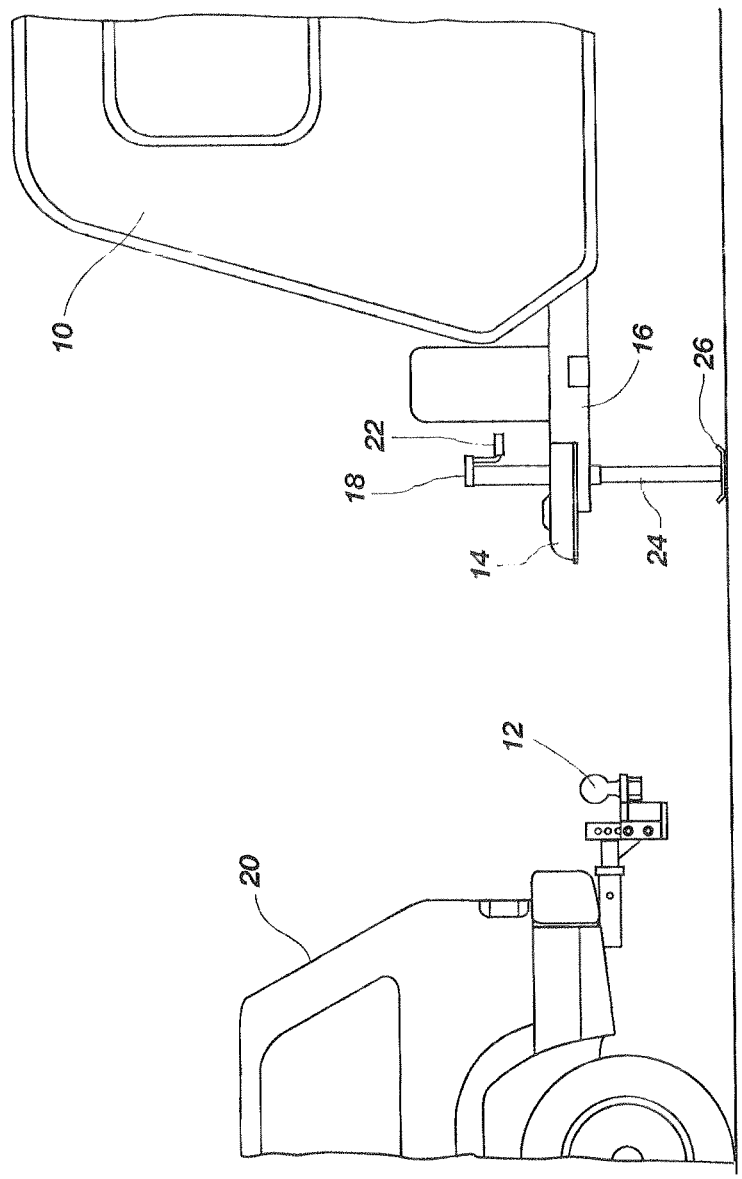
FIG. 1 depicts a vehicle and trailer towing system.
Figure 2:
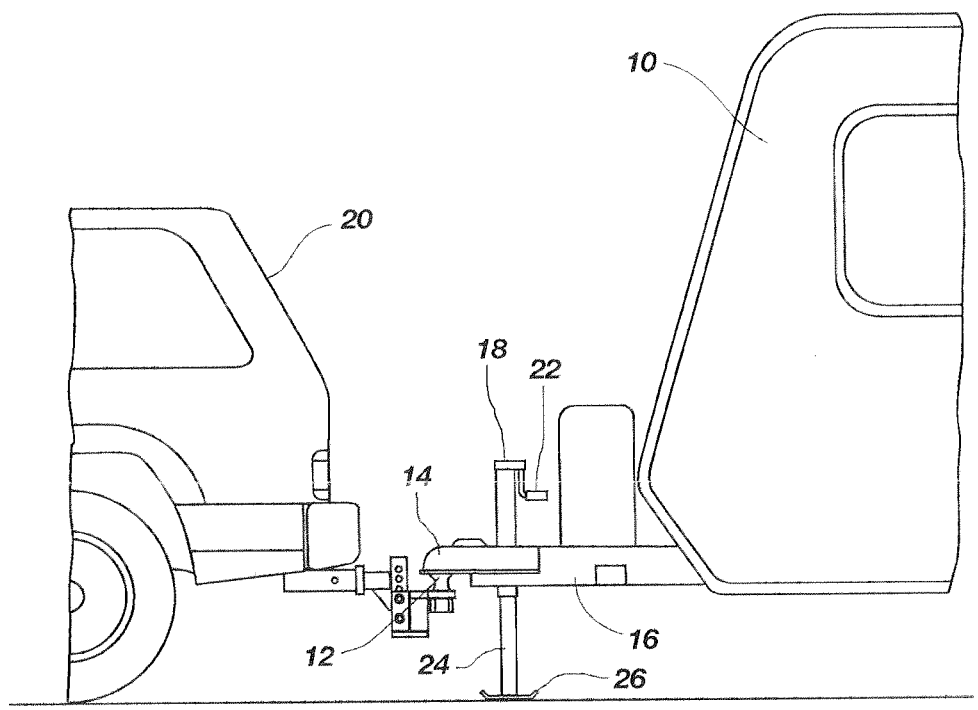
FIG. 2 depicts a vehicle and trailer towing system.
Figure 3:
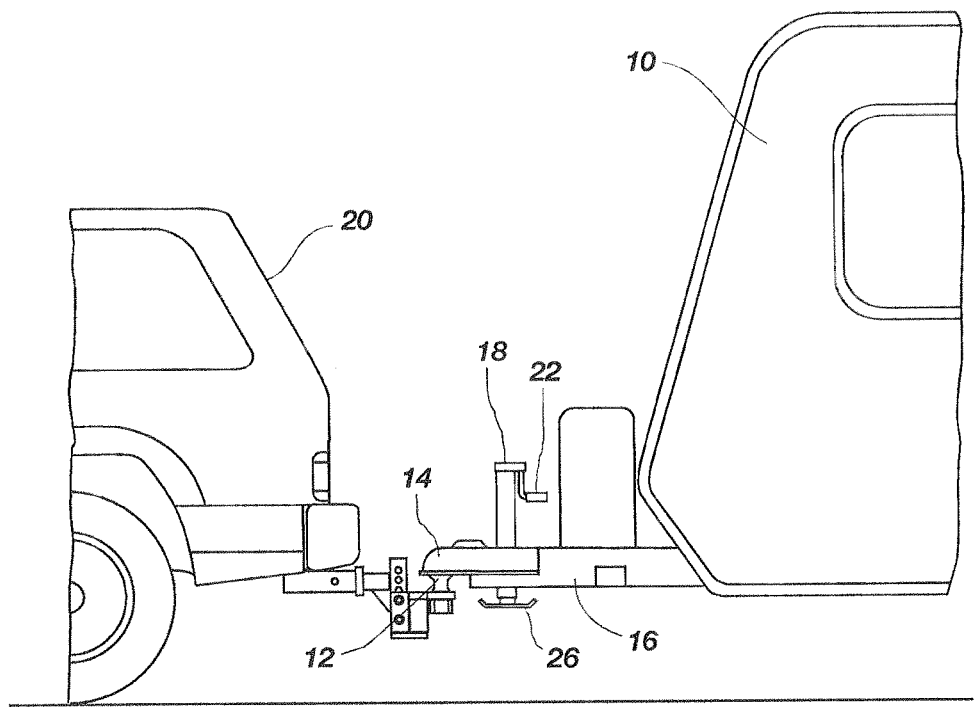
FIG. 3 depicts a vehicle and trailer towing system.
Figure 4:
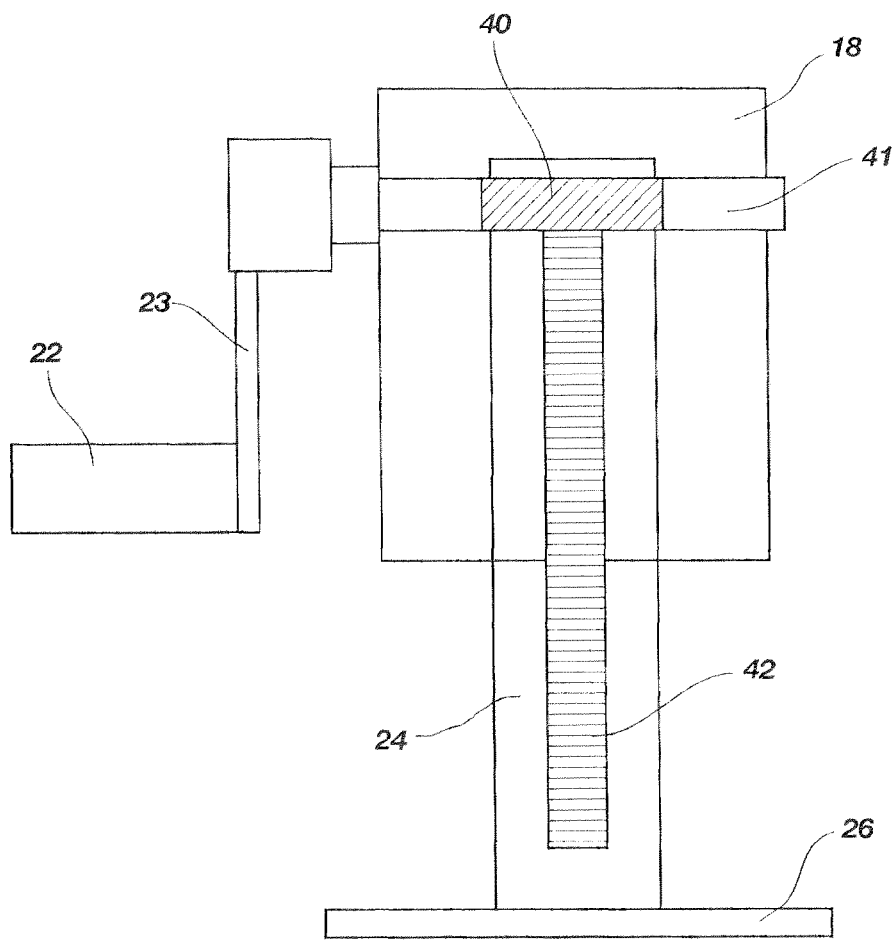
FIG. 4 depicts a jack used with a vehicle and trailer towing system.
Figure 5:
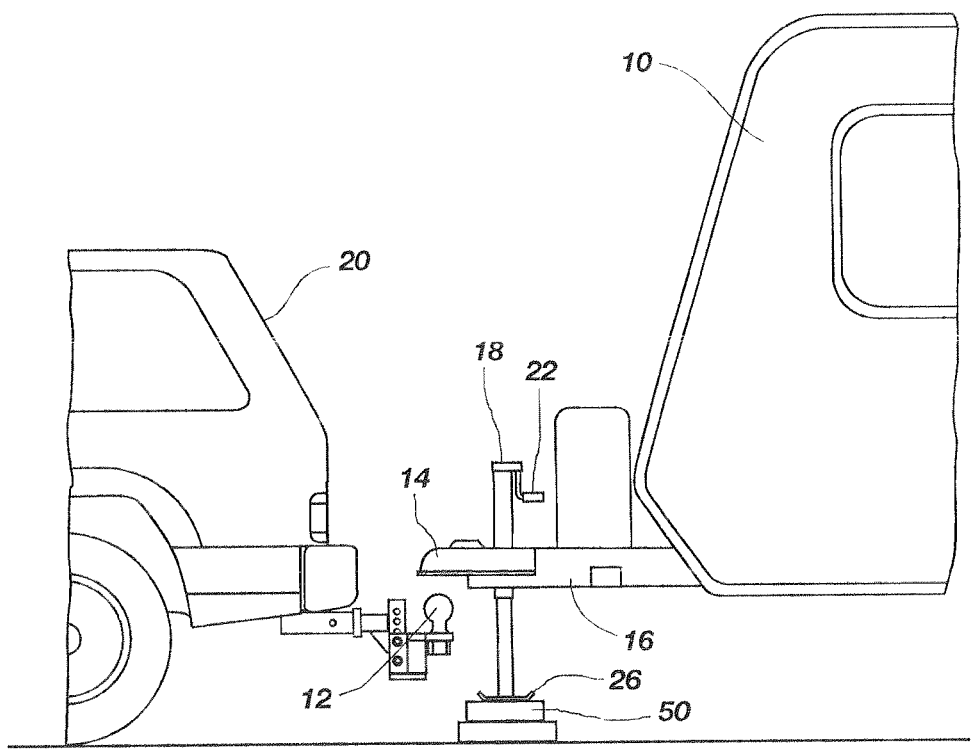
FIG. 5 depicts blocks being used with a vehicle and trailer towing system.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for providing a trailer jack system are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Figure 25:
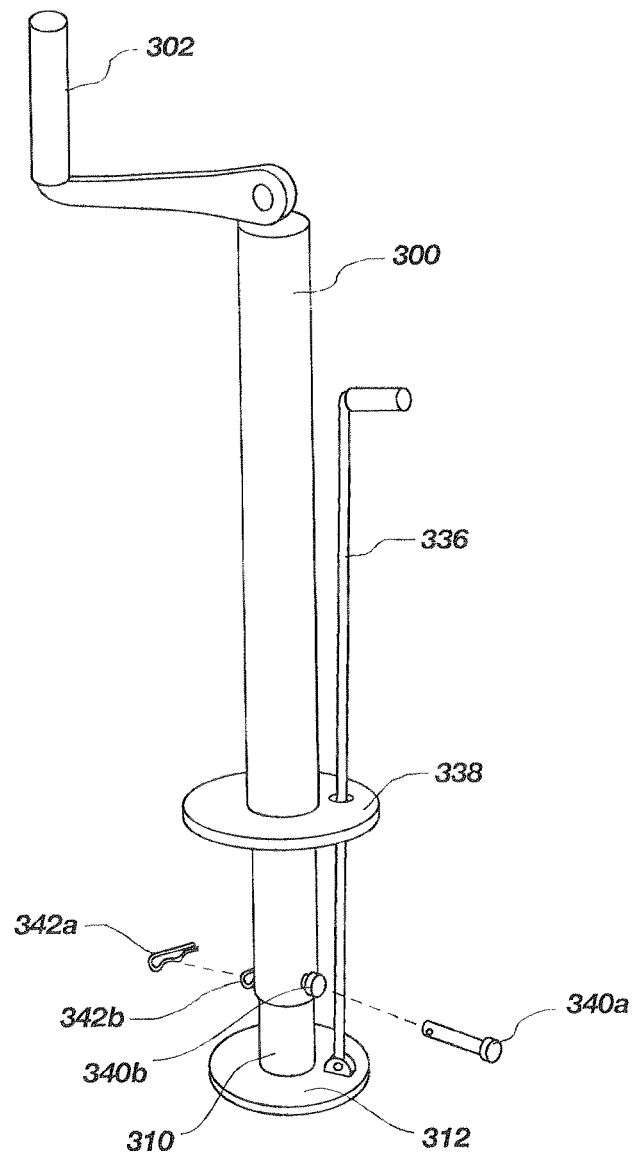
FIG. 25 depicts a view of one embodiment in accordance with the disclosure in use.
Figure 26:
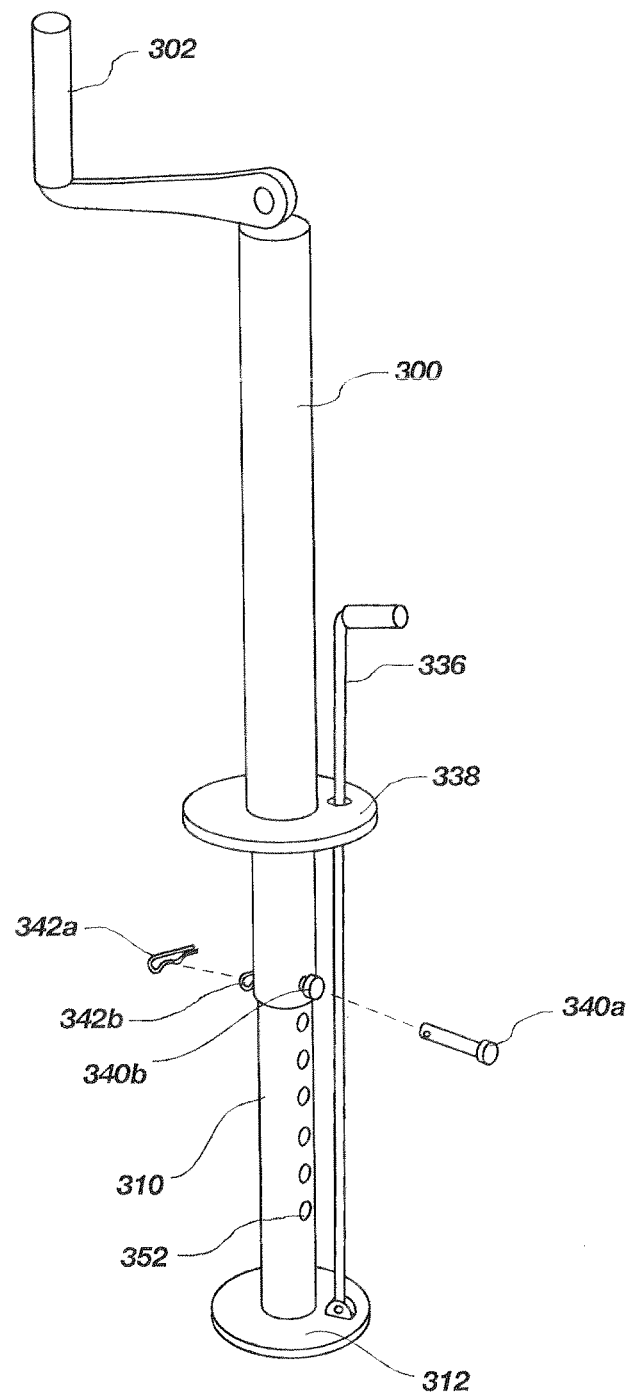
FIG. 26 depicts a view of one embodiment in accordance with the disclosure.

A jack as defined herein is any mechanism that offers a mechanical advantage between an input and an output. The phrase "height adjustment means" for raising or lowering an object such as a trailer tongue, as used herein shall include and cover a jack. Referring briefly to FIG. 25, for example, a jack 300 may, for example, include a housing (shown as the cylindrical member associated with item 300) and a first movable member 301 movably attached relative to the housing such that said first movable member 301 is movable toward or away from the housing, and the embodiment of FIG. 25 also includes a second movable member 310 movably attached relative to the first movable member 301 such that said second movable member 310 is movable toward or away from the first movable member 301. A locking mechanism, such as pin 340 and clip 342 may be included for retaining the second movable member 310 relative to the first movable member 301. The first movable member 301 may be a telescoping member, or a sliding member, or a member providing any other type of relative movement useful as part of a height adjustment means such as a jack or other height adjustment means. The second movable member 310 may be a telescoping member, or a sliding member, or a member providing any other type of relative movement useful for movement relative to the first movable member 301, especially if such movement is caused by a handle 336.

Figure 6:
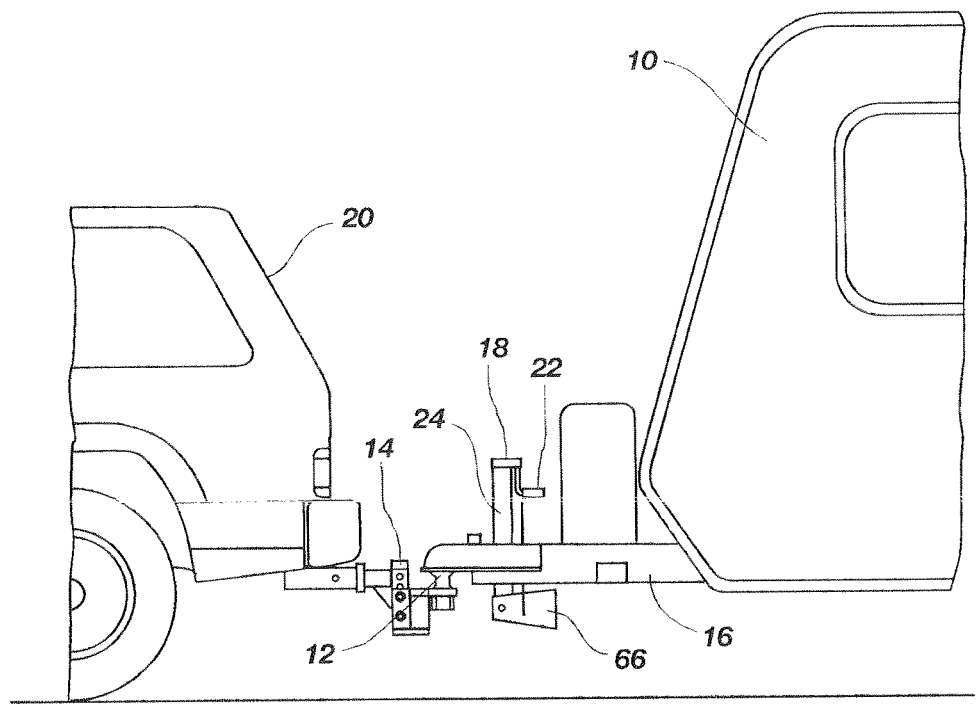
FIG. 6 depicts a side view of one embodiment in accordance with the disclosure.

Referring now to FIG. 6, a side view of a trailer 10 and towing vehicle 20 system is shown in accordance with the principles of the present disclosure. It will be understood that the towing vehicle 20 may be any variety of vehicle known in the art, such as a truck, tractor or car, or any other variety of on-road or off-road vehicle. Likewise, the principles of the present disclosure may be utilized with any variety of trailer 10 known in the art, such as camping trailers, boat trailers or cargo trailers.

The trailer 10 and towing vehicle 20 may include a ball hitch 12 for attaching to a ball socket 14 on a tongue 16 of the trailer 10 in a manner known in the art. It will be understood that the trailer 10 and towing vehicle 20 system may be made more convenient, as explained more fully below, to allow the ball hitch 12 to be aligned more easily and faster with the socket on tongue 14, when the trailer 10 is detached and attached from and to the towing vehicle 20.

A jack 18 may be used on the tongue 16 to raise and lower the tongue 16 of the trailer 10 to aid in the hitching of the tow vehicle 20 with the trailer 10. A jack 18 is generally made up of an actuation portion 22, a post portion 24 and a foot portion 66. The actuation portion 22 may comprise a user interface which is commonly a handle or crank of some kind. In the case of a handle and crank, the user would take the handle in hand and rotate the crank in a circular motion. The force applied by the user is multiplied by the mechanical advantage of the jacking mechanism. An electric motor may also be employed to actuate the jack mechanism. An electric motor may be configured to run at the optimal speed for a balance of speed and power. In the case of a trailer, the mechanical mechanism of the jack requires a great amount of motion at the handle and produces a small mount of motion of the post portion 24 or foot portions 66. The post portion 24 rigidly fixes the foot portion 66 to the drive mechanism or the jack 18. The foot portion 66 generally makes contact with the ground and is typically wider than the post portion 24 to distribute the weight of the trailer 10.

In use, the tow vehicle may be positioned near the trailer such that the ball 12 on the vehicle 20 is located under the ball socket 14 of the trailer 10. As is shown in FIG. 6, the ball socket 14 may be lowered over ball 12 by actuating the jack 18 with the crank handle 22, thereby retracting upwardly the jack post 24. As the ball 12 makes contact inside the ball socket 14, some of the weight of the trailer 10 in transferred to the vehicle 20. One of the shortcomings of the prior art can be alleviated by providing a jack foot 66 that can be rotated into and out of position in order to make the trailer 20 ready for towing so that it does not impact the ground during travel. FIG. 6 depicts the jack foot 66 raised and rotated in the upper most position.

Figure 7:
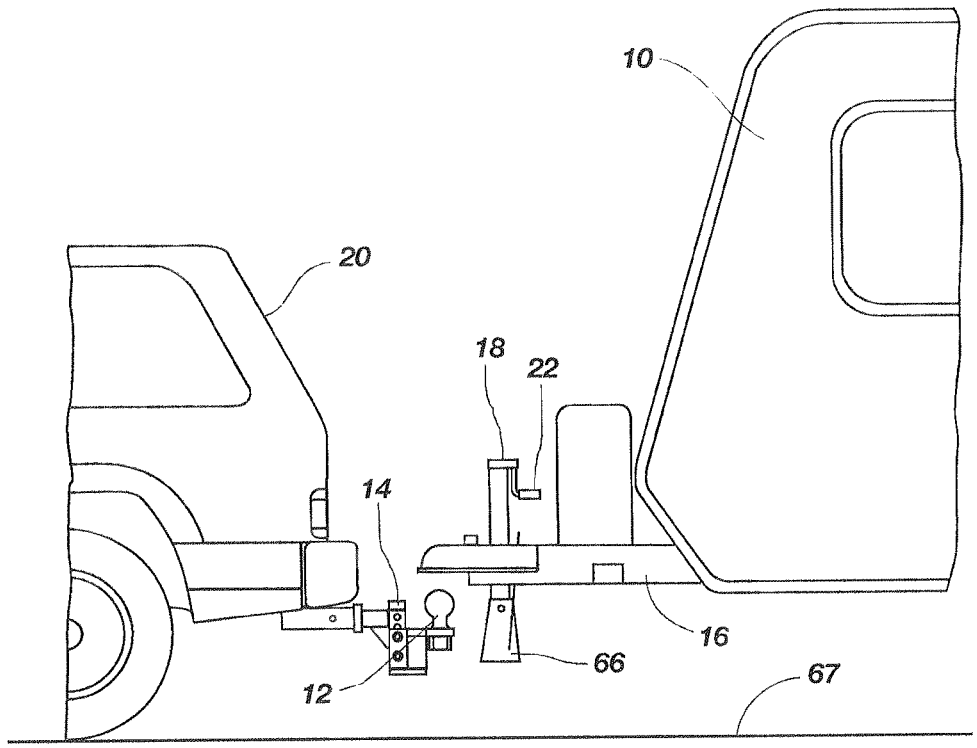
FIG. 7 depicts a side view of one embodiment in accordance with the disclosure.

Illustrated in FIG. 7, the foot 66 is shown rotated in the down position. It can be seen that there is less distance now between the foot 66 and the ground 67. The process can be performed with a jack foot of varying lengths or proportions to achieve the desired results. For example, the jack foot 66 could be of a configuration such that rotating it downwardly requires very minimal use of the jack 18.

Figure 8:
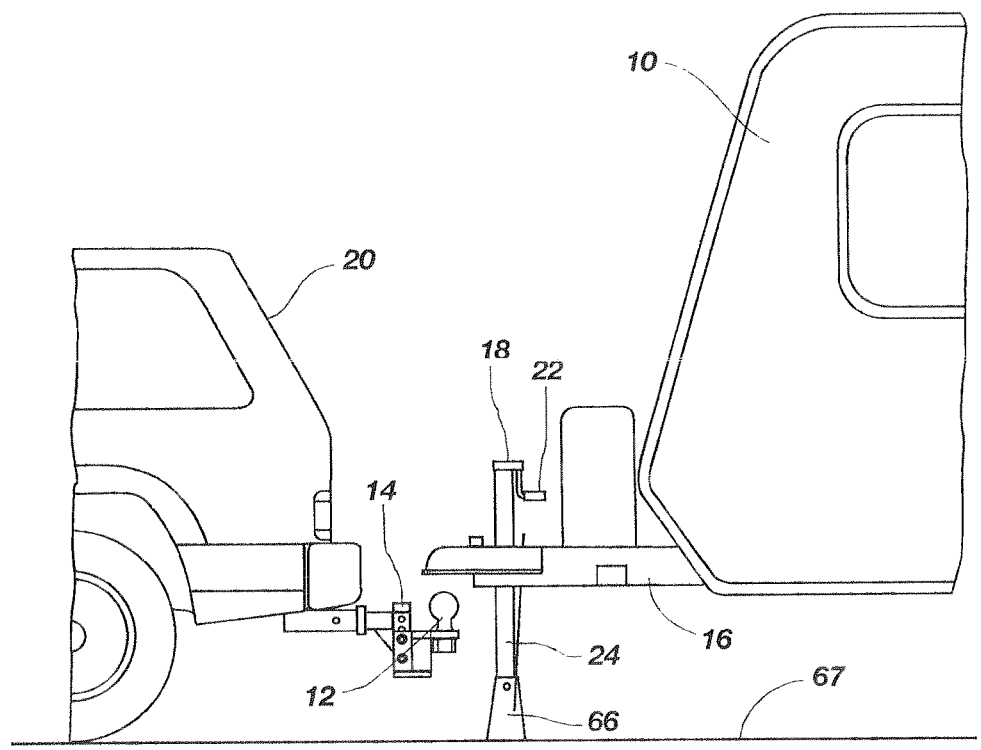
FIG. 8 depicts a side view of one embodiment in accordance with the disclosure.

FIG. 8 illustrates the foot 66 in contact with the ground 67, and the post 24 extended by the jack 18 such that the trailer 10 is supported on the foot 66.

Figure 9:
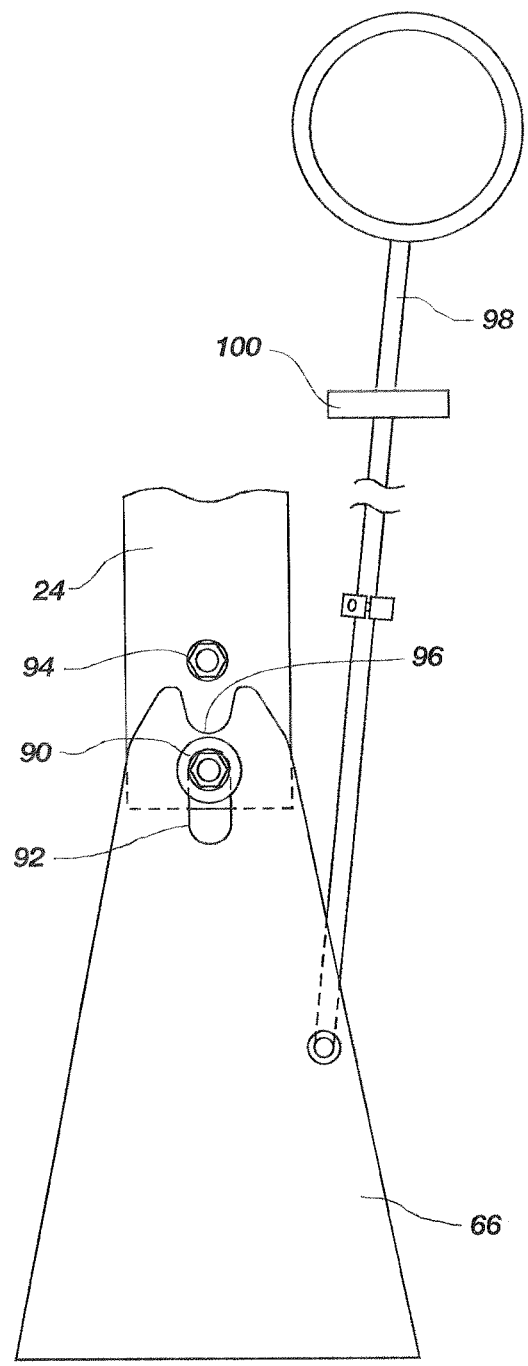
FIG. 9 depicts a close up side view of one embodiment in accordance with the disclosure.

FIG. 9 illustrates a detailed view of an embodiment of a jack foot. The illustration shows a portion of a of jack post 24 and jack foot 66. The jack foot 66 may be pivotally attached to the post 24 with a pivot bolt 90 through a slot 92. A securing bolt 94 and locking slot 96 may be provided wherein the securing bolt 94 and locking slot 96 (also referred to herein as "locking engagement surface") may provide a locking mechanism that will not allow the foot 66 to pivot under the weight of the trailer relative to the jack post 24. As shown clearly in FIG. 9, the locking slot 96 may take the form of an open notch formed in a terminal side edge of the jack foot. A locking mechanism may take many forms and may be located anywhere on the foot 66 and the post 24. Additionally, it is within the scope of this disclosure to contemplate the use of automatic locking mechanisms and the use of electrical or hydraulically assisted and actuated mechanisms. The embodiment may further comprise the use a retracting handle 98 which may pass through a passageway through the tongue of a trailer and fixedly attach to the jack foot 66 and may be configured to actuate a pivot movement around the pivot bolt 90 and slot 92. Slot 92 may be formed so as to be parallel with said jack post so as to aid in the controlled loading of the system. In some embodiments it may be advantageous to have a frame mounted retainer 100 included that can hold the retracting handle 98 in a place or places and therefore holding the jack foot 66 in a position or positions.

One embodiment of the present disclosure may include various types of retaining the retracting handles. A simple friction system may be used to retain the retracting handle. A cotter pin may also be used to retain the retracting handle 98. The retainer 100 may be formed as a pin, bolt, clip, or any other suitable retention mechanism known to those skilled in the art.

Figure 10:
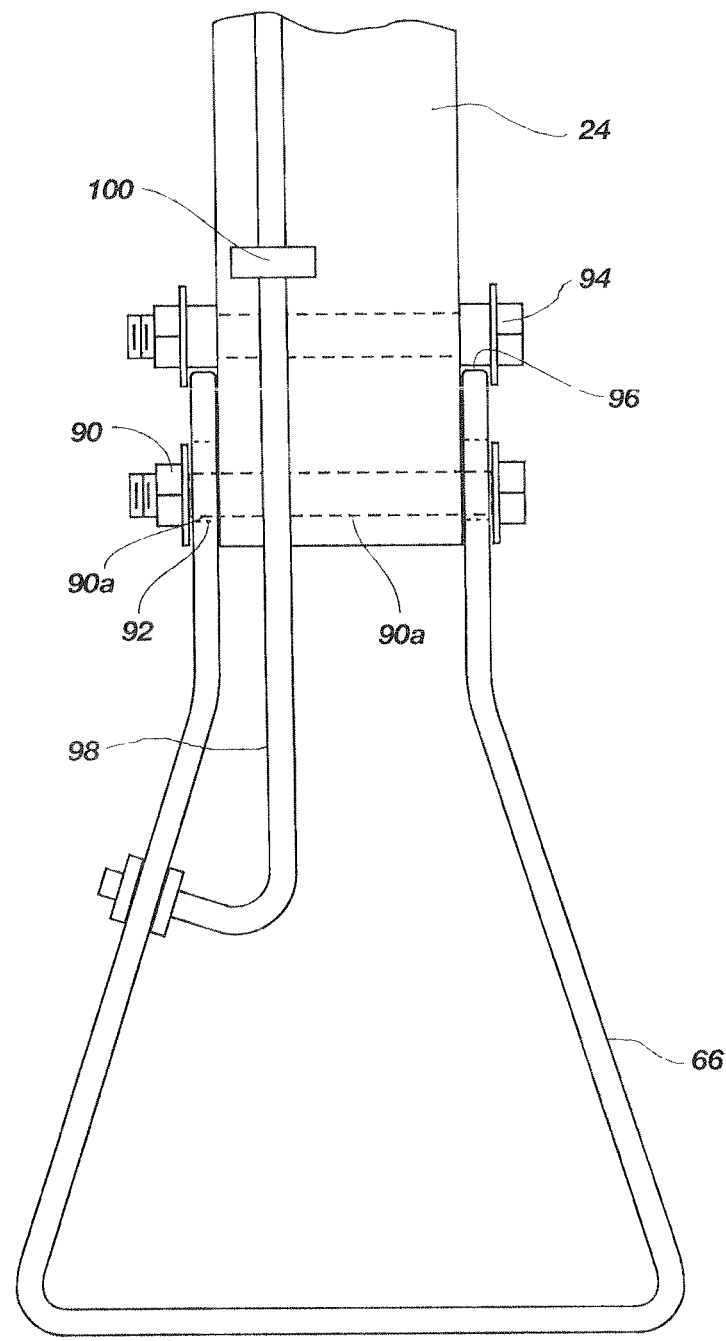
FIG. 10 depicts a close up rear view of one embodiment in accordance with the disclosure.

FIG. 10 illustrates a detailed rear cut away view of an embodiment of the jack foot 66 in a two-point locked position. The illustration shows a portion of jack post 24 and jack foot 66. The jack foot 66 may be pivotally attached to the post 24 with a pivot bolt 90 through the slot 92 (shown spaced apart from bolt body 90a for illustration purposes, but with the understanding that bolt body 90a is actually in contact with slot 92). A securing bolt 94 and locking slot 96 may be provided wherein the securing bolt 94 and locking slot 96 may provide a locking mechanism that will not allow the foot 66 to pivot under the weight of the trailer relative to the jack post 24. A locking mechanism may take many forms and may be located anywhere on the foot 66 and the post 24. The embodiment may further comprise the use of a retracting handle 98 which may pass through a passageway through the tongue of a trailer, and fixedly attach to the jack foot 66, and may be configured to actuate a pivot movement around the pivot bolt 90 and slot 92. In some embodiments it may be advantageous to have a frame mounted retainer 100 included that can hold the retracting handle 98 in a place or places and therefore holding the jack foot 66 in a position or positions.

One embodiment of the present disclosure may include various types of retaining the retracting handles. A simple friction system may be used to retain the retracting handle. A cotter pin may also be used to retain the retracting handle 98. The retainer 100 may be formed as a pin, bolt, clip, or any other suitable retention mechanism known to those skilled in the art. It is also within the scope of the disclosure to have a bracket that attaches to the jack post for receiving a foot portion thereon. The pivot bolt and securing bolts may be considered a bracket or may be part a bracket.

As can be observed in FIG. 10, the jack foot 66 is rotatable relative to the jack post 24. The jack foot 66, as clearly shown in FIG. 10, may have two opposing sidewalls that slant outwardly and away from each other in a proximal-to-distal direction in a lower half of the jack foot 66. Further, the jack foot 66 may have a jack foot slot 92 formed in each of the two opposing sidewalls as shown in FIG. 10, such that a through-passage is thereby formed that extends through the entire jack foot 66 from one of said sidewalls to the other of said sidewalls. As shown in FIG. 10, the jack foot 66 may include a one-piece body formed by the two opposing sidewalls.

Figure 11:
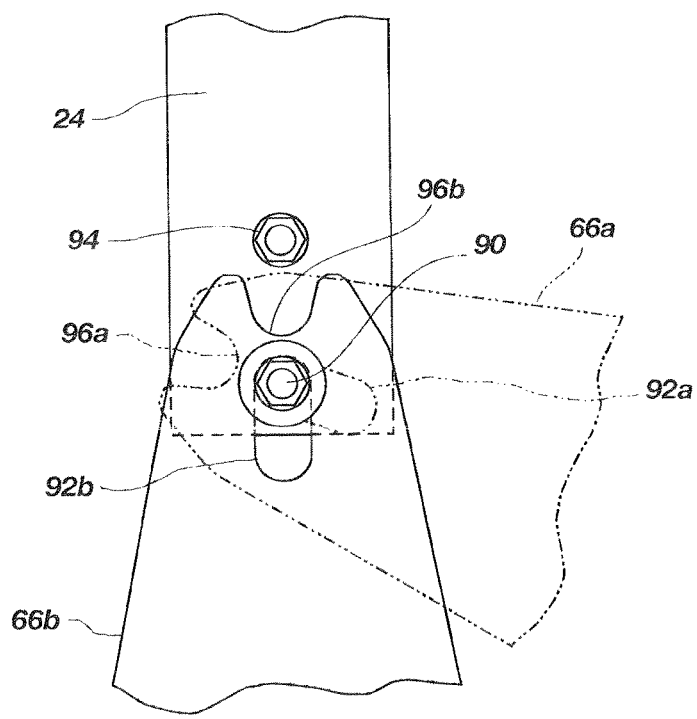
FIG. 11 depicts a side view of one embodiment in accordance with the disclosure in rotation.
Figure 12:
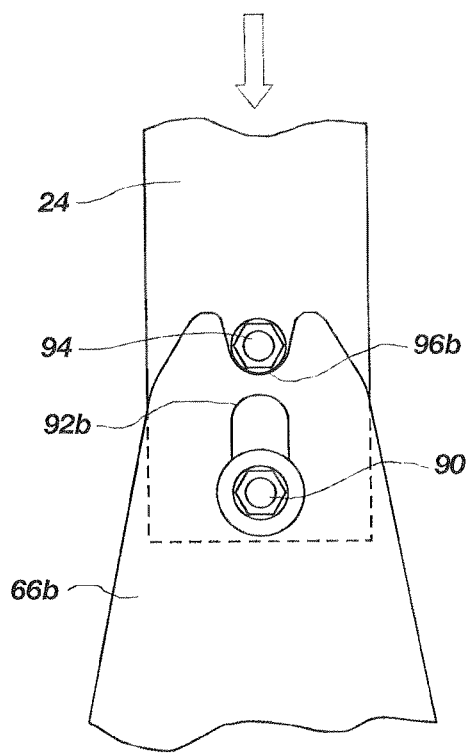
FIG. 12 depicts a side view of one embodiment in accordance with the disclosure as rotated.

With reference to FIG. 11, an embodiment of the jack foot locking mechanism will be discussed as being moved from a first position 66a to a second position 66b. The figure denotes the unlocked locking slot as 96a and unlocked pivot slot as 92a. The locked depictions are 96b and 92b respectively. As the jack post settles down into the jack foot 166, the securing bolt 94 engages the locking slot 96b, thereby providing a second laterally fixed point of contact resulting in a lock against rotation around the pivot bolt 90. FIG. 12 depicts a close up view of the jack post 24 and jack foot 66b and the interaction they have in a locked position. The arrow denotes the downward force and movement in that direction.

It will be understood that locking slot 96, or locking slot 96b, are merely one example of a locking engagement surface. Any suitable surface disposed on the foot 66, especially a surface that defines a concave recess, can serve as a locking engagement surface within the scope of the invention.

Figure 13:
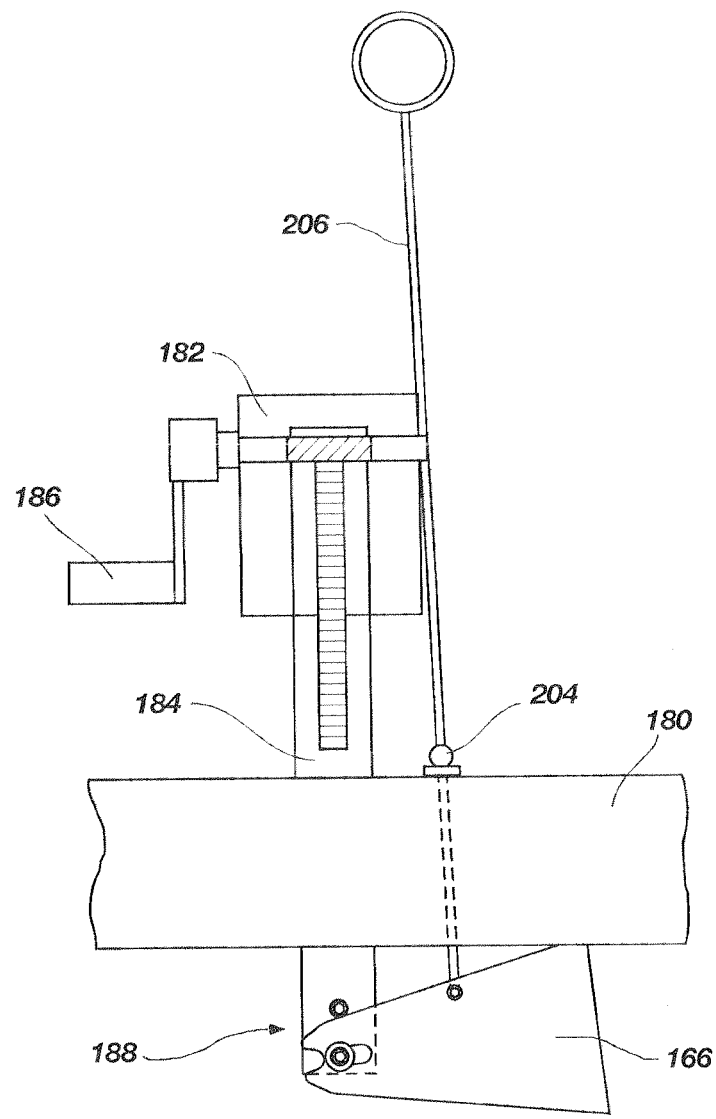
FIG. 13 depicts a side view of one embodiment in accordance with the disclosure in use.

With reference to FIGS. 13-21, a method of use will be discussed. FIG. 13 illustrates the jack foot 166 as seen in the upper most position. The tongue 180 of a trailer is illustrated with the jack 182 mounted thereon. The jack may also have a jack post 184 and a crank handle 186. The retainer 204 can be seen holding the retracting handle 206 in an up position. A pivot locking mechanism 188 as previously described may comprise a pivot bolt through a slot, and a securing bolt interacting with a locking slot. Wherein the securing bolt and locking slot may provide a locking mechanism that will not allow the foot to pivot under the weight of the trailer relative to the jack post. A locking mechanism may take many forms and may be located anywhere on the foot and the post. The system is shown in an unlocked and un-weighted position. In use a user would grasp the retracting handle 206 and actuate the retainer 204 to allow the retracting handle to be put into motion. The user would move the handle 206 toward the tongue 180 such that the jack foot is rotated about the pivot locking mechanism 188.

Figure 14:
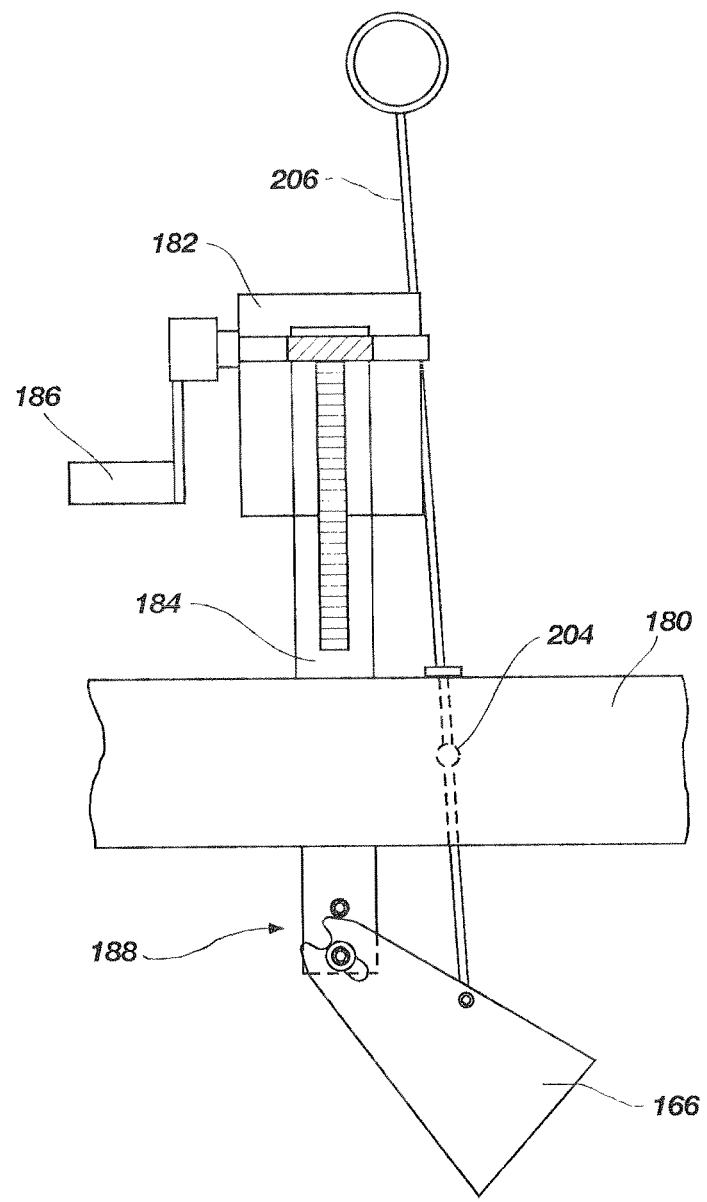
FIG. 14 depicts a side view of one embodiment in accordance with the disclosure in use.

In FIG. 14 the retracting handle is being lowered toward the tongue and the jack foot 166 is mid way between the up and down positions. The retainer 204 can be seen in dashed lines as it descends through or behind the tongue 180 portion.

Figure 15:
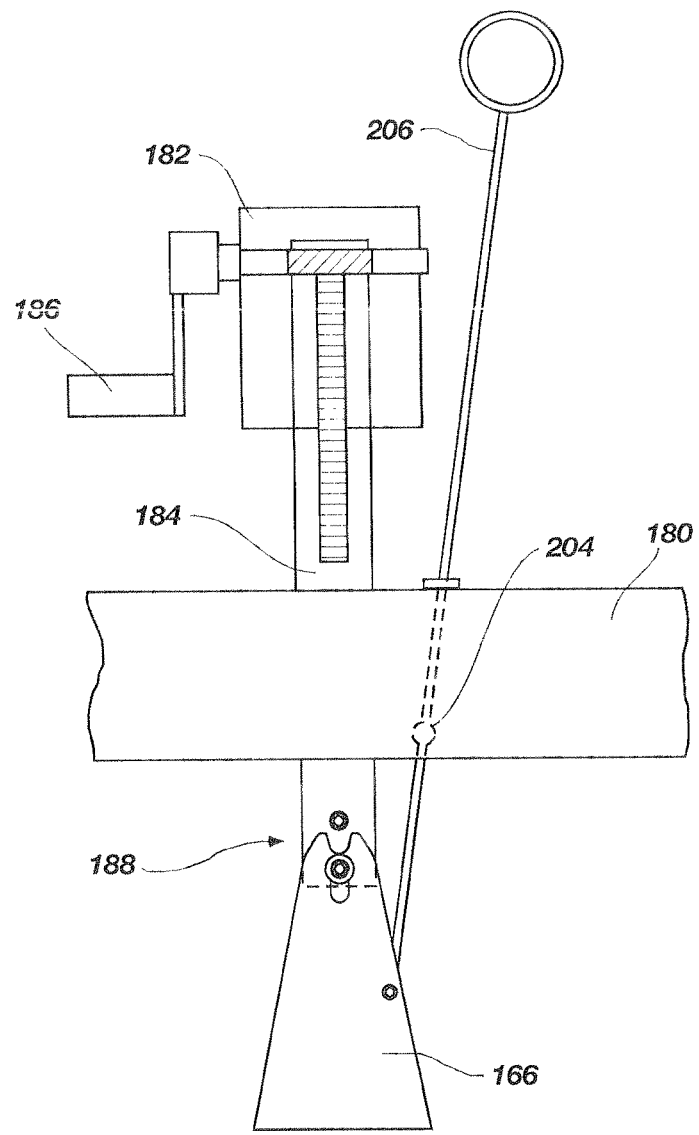
FIG. 15 depicts a side view of one embodiment in accordance with the disclosure in use.
Figure 16:
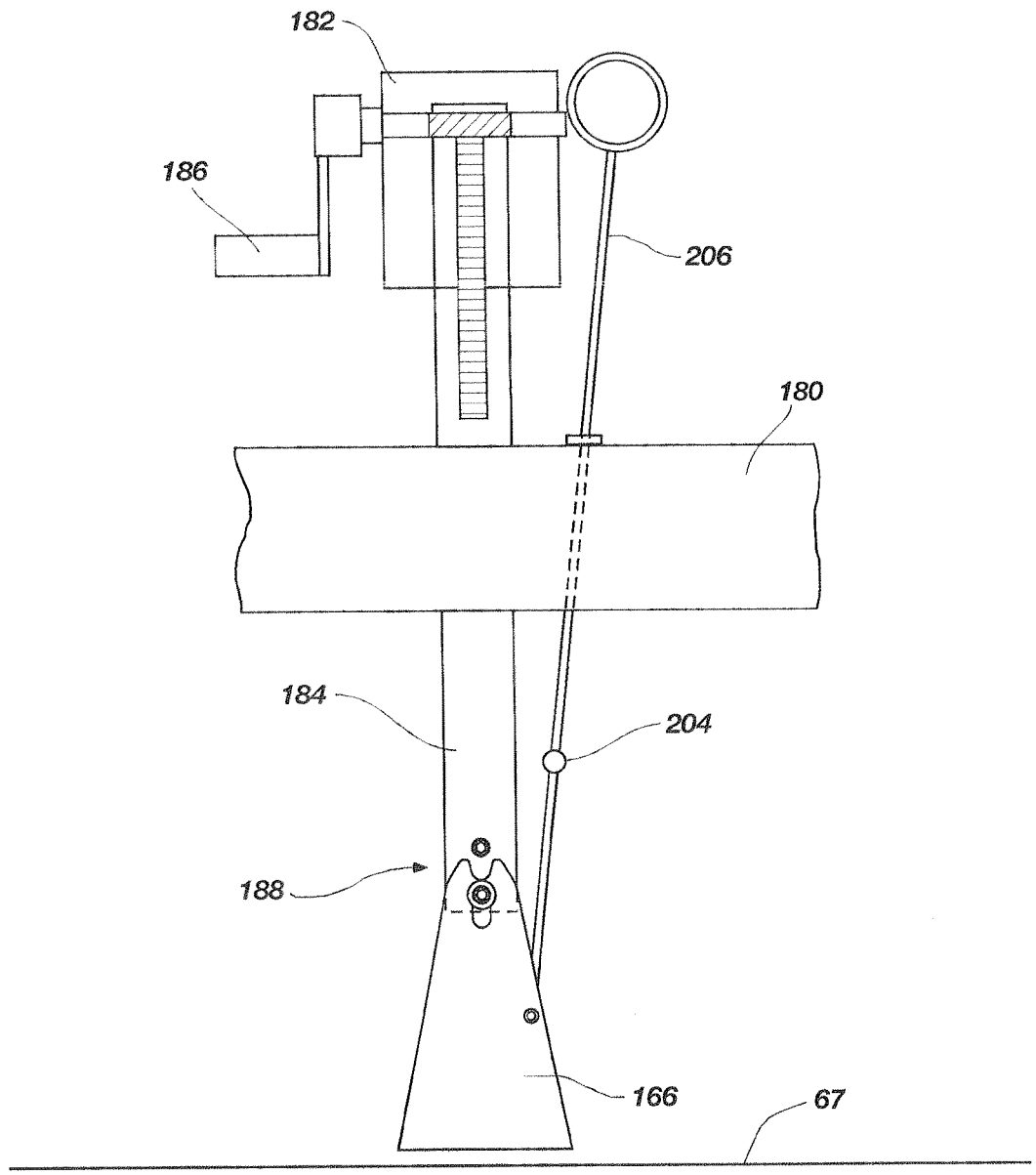
FIG. 16 depicts a side view of one embodiment in accordance with the disclosure in use.

In FIG. 15 the jack foot 166 is illustrated in its down most rotated position. In FIG. 16 the jack foot 166 is not bearing the weight of the trailer and is also in an unlocked position as the securing bolt is not resting in the locking slot. The user then begins to turn the crank handle 186 to actuate the jack 182 until the jack foot 166 contacts the ground.

Figure 17:
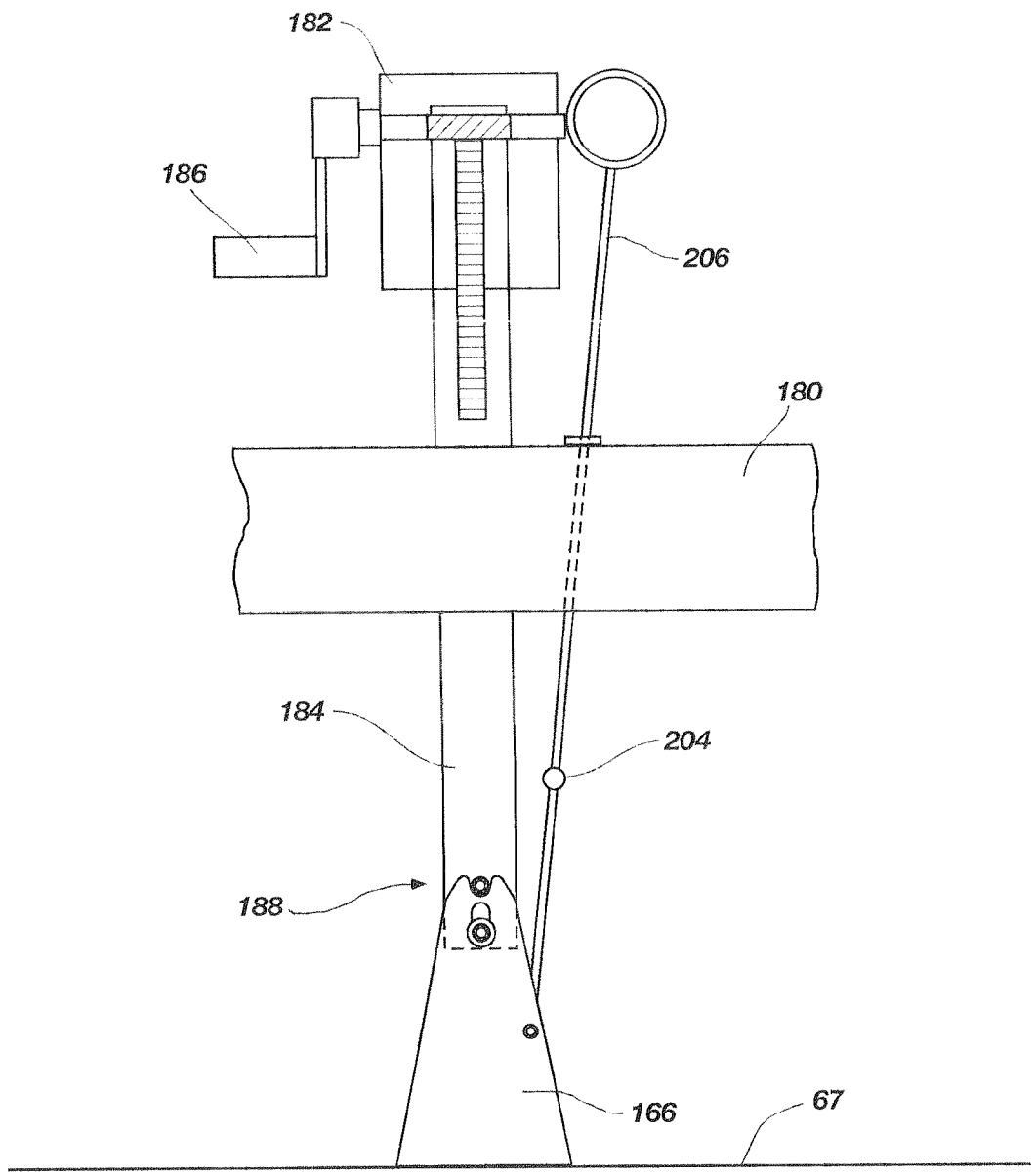
FIG. 17 depicts a side view of one embodiment in accordance with the disclosure in use.

As illustrated in FIGS. 16 and 17, once the jack foot has reached the ground and bears the weight of the trailer, the locking mechanism 188 is actuated as the securing bolt is pushed in to the locking slot. The pivot slot allows the jack post 184 to slide linearly in to the jack foot 166. The slot may be configured as curved slot without deviating from within the scope of this application. The two point lock prevents the trailer from collapsing the jack foot 166 by rotation.

Figure 18:
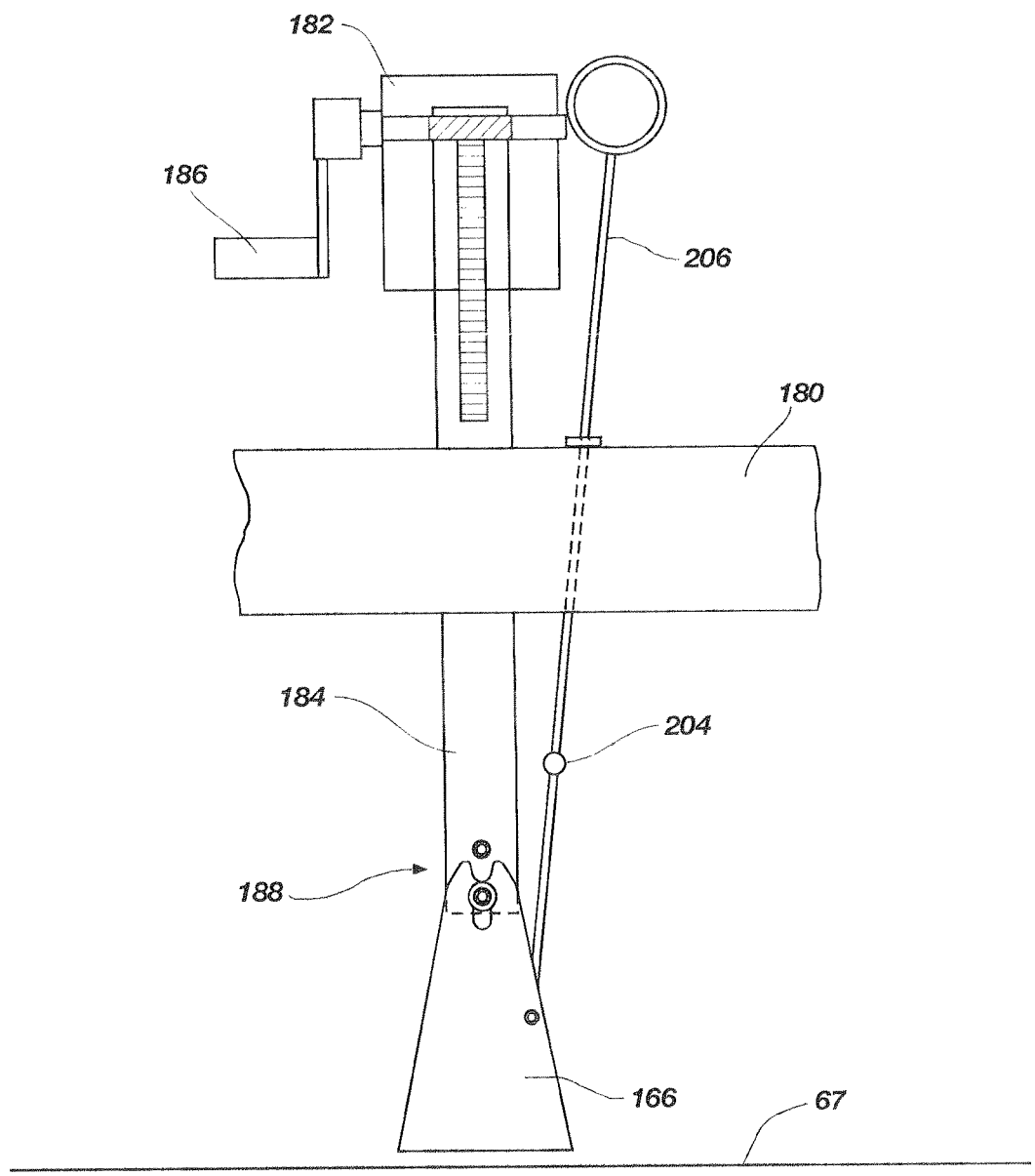
FIG. 18 depicts a side view of one embodiment in accordance with the disclosure in use.

The process is now ready to be reversed. In FIG. 18 the crank handle 186 is cranked by the user to lift the foot 166 from the ground as the weight of the trailer is supported by the vehicle. As the jack foot 166 is un-weighted the foot falls due to its own weight along the path of the locking mechanism 188 consequently releasing the securing bolt from the locking slot thereby unlocking the locking mechanism 188.

Figure 19:
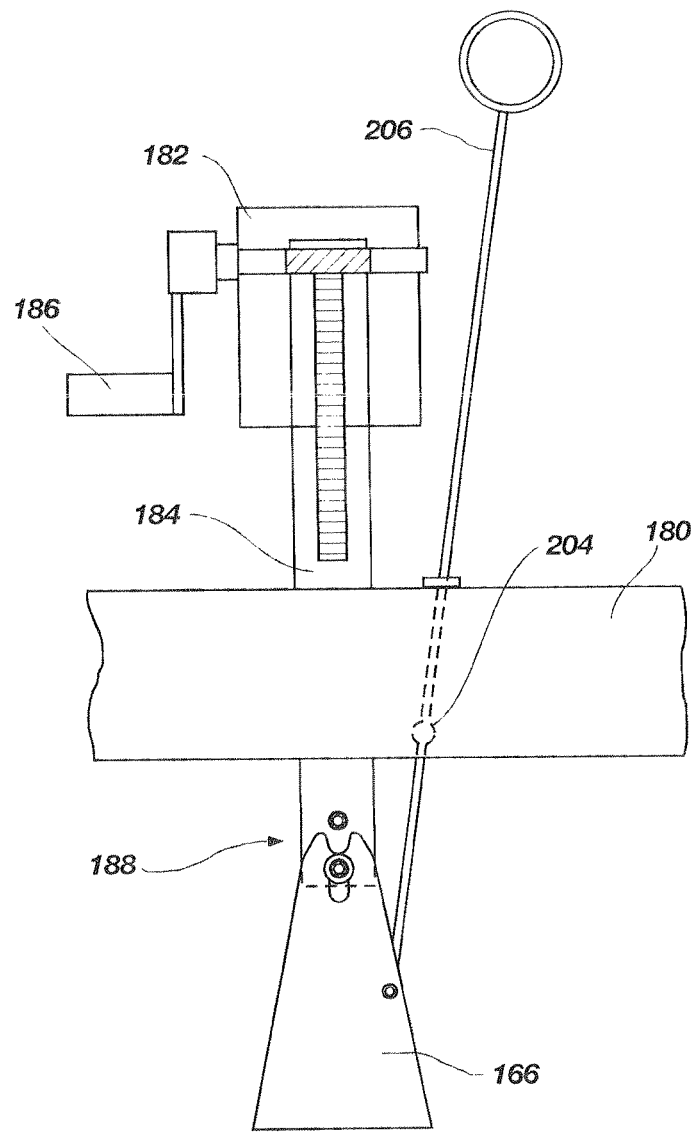
FIG. 19 depicts a side view of one embodiment in accordance with the disclosure in use.
Figure 20:
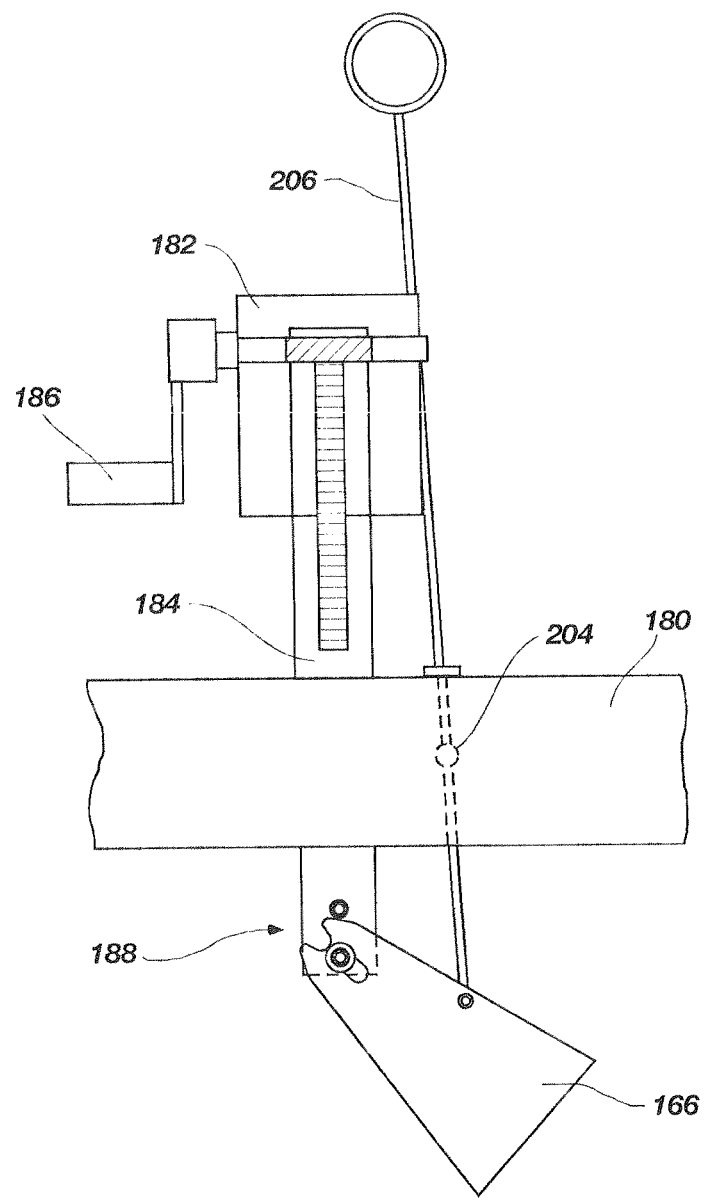
FIG. 20 depicts a side view of one embodiment in accordance with the disclosure in use.

In FIGS. 19 and 20 the user actuates the retracting handle 206 causing the rotation of the jack foot 166 around the pivot locking mechanism 188.

Figure 21:
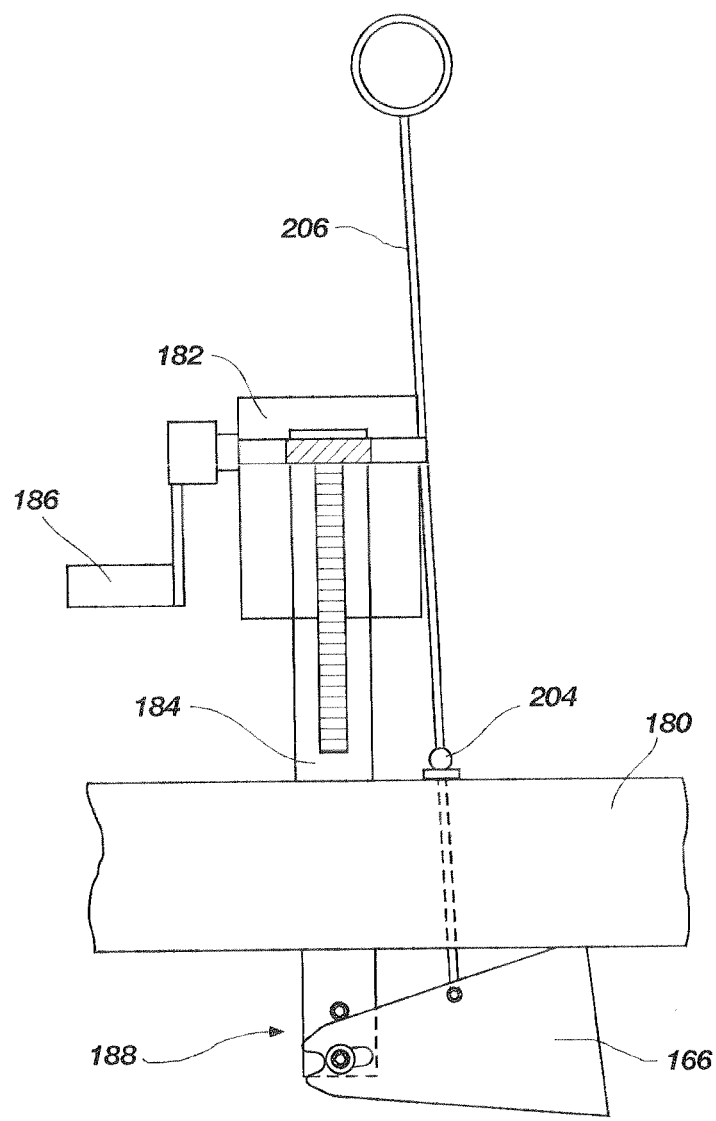
FIG. 21 depicts a side view of one embodiment in accordance with the disclosure in use.

In FIG. 21 it is illustrated that after full actuation of the retracting handle 206 it can be locked in place with the retainer 204, resulting in the jack foot 166 being locked in the upper most position. It is within the scope of this application to contemplate that it may be desirous to hold the jack foot in intermediate positions between those steps shown. Various locking/holding means may be employed and are contemplated by this application.

Figure 22:
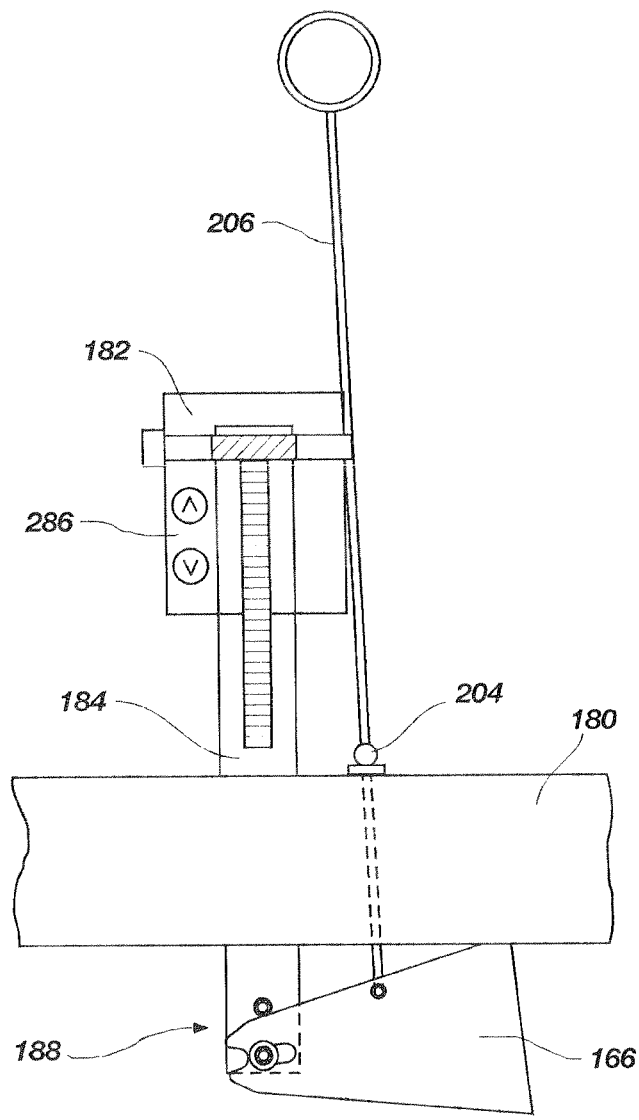
FIG. 22 depicts a side view of one embodiment in accordance with the disclosure.

With reference to FIG. 22 it will also be appreciated that other similar mechanical and electronic variations on the trailer jack method are within the scope of the present disclosure. For example, an electronic motor with controls 286 may be provided for ease of use and all of the advantages of the jack foot 166. It will be understood that one embodiment of the jack system may be installed on trailers by the manufacturer. Accordingly, it will be understood that one embodiment of the tongue may not need to be modified or customized to be compatible with the jack system 10. Thus, the principles of the present disclosure may be compatible with standardized equipment.

Figure 23:
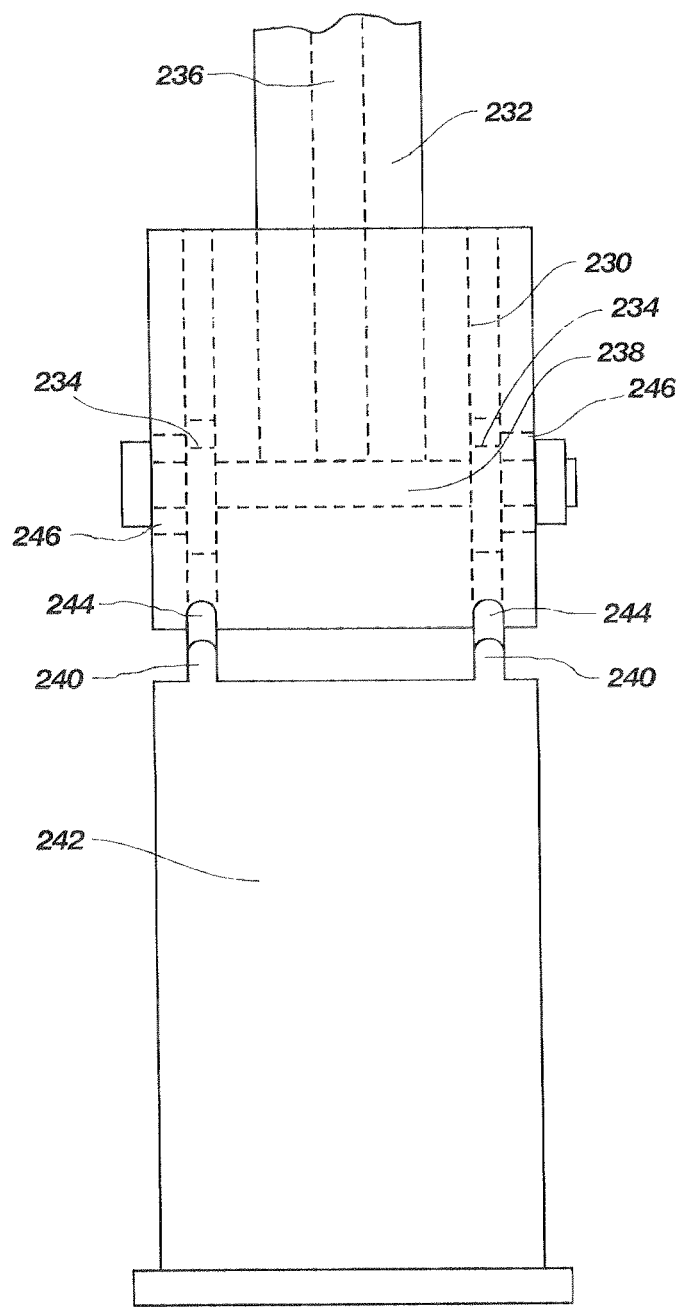
FIG. 23 depicts a front view of one embodiment in accordance with the disclosure.
Figure 24:
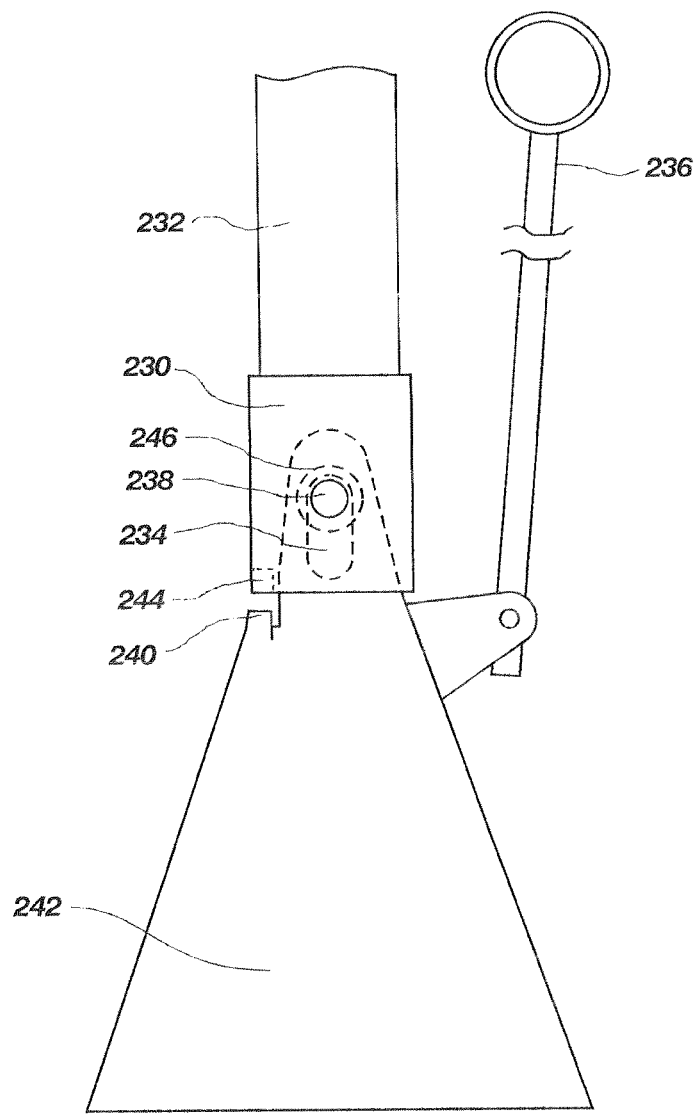
FIG. 24 depicts a side view of one embodiment in accordance with the disclosure.

With reference to FIGS. 23 and 24 and embodiment will be discussed having a bracket 230 configured to receive a jack post 232. The embodiment may further comprise a slot 234 in said jack foot 242. The embodiment may further comprise an elongate handle 236 extending from a jack foot 242. The slot 234 may be configured to mechanically communicate with a pivot bolt 238. The embodiment may further comprise a protrusion 240 on the jack foot at a distance from an area around which the jack foot 242 rotates. The embodiment may further comprise a recess 244 on said bracket corresponding to said protrusion 240 such that when the jack foot 242 is in a loaded position said protrusion 240 mechanically interacts with said recess 244.

One embodiment of the jack may include spacer bushings 246, securing bolts and pivot bolts. It is within the scope of this disclosure to include any fasteners that would appropriately replace or augment pivoting and retaining. The spacer bushings may be configured to provide lubrication or accept lubrication for the movement of the jack foot. Additionally, the spacer bushings, securing bolt and pivot bolt may be components of the locking and the retaining of the jack foot in any position. The spacer bushings, securing bolt and pivot bolt may also be configured to bear all or part of the force exerted on the tongue of the trailer. Alternatively, any spacer bushings, the securing bolt and the pivot bolt may be configured without consideration of bearing the weight of the trailer. Additionally, a sensor or manual indicator may be integrated into the jack for reporting to a user whether the jack foot is in the up or down position. The reporting may be done remotely or at the jack.

With reference to FIGS. 25, 26, 27, 28, and 29 an embodiment will be discussed having a telescoping portion. The embodiment may comprise an outer housing 300 having a jack crank/handle 302 on the top thereof. For telescoping purposes the embodiment may further comprise a first telescoping member or outer cylinder 301 and a second telescoping member or inner cylinder 310 configured and sized so as to slide in and out of said outer housing 300. When the crank 302 is operated as known in the art, a height adjustment means contained in the outer housing 300 mechanically communicates with the outer cylinder 301 causing it to raise or lower. A foot portion 312 may be disposed on an end of said inner cylinder 310. The embodiment may further comprise an elongate handle 336 extending from a foot portion 312. The elongate handle 336 may be held in position by a guide 338. The embodiment may further comprise a pin 340 and clip 342 for retaining the outer cylinder 301 and the inner cylinder 310 in position relative to each other.

Additionally, a sensor or manual indicator may be integrated into the jack for reporting to a user whether the jack foot is in the up or down position. The reporting may be done remotely or at the jack. In use the pin 340 is removed as shown by phantom lines in FIGS. 25 and 26, and the clip 342 is removed as also shown in phantom lines, to allow the telescoping action of the jack. This may be done while grasping the handle/lever 336. The telescoping foot portion 312 extender will drop down mostly by its own weight, but also guided by the person holding the handle/lever 336. When the foot 312 has been extended the desired length, the handle/lever 336 is used to align the desired through hole 352, and then the pin 340 & clip 342 are reinserted to lock the jack foot to the desired extension position.

This is all done without turning the jack crank/handle 302 any rotations on the jack itself. However, the jack foot extender may still not be enough to reach the ground. it may be necessary to still utilize the rotation of the jack, but it will require far less rotations due to the quick extension gained by the telescoping jack foot or inner cylinder 310.

To quickly retract using far less rotations of the jack crank/handle 302 itself, the pin 340 and the clip 342 are detached and the handle/lever 336 is lifted up, causing the foot 312 to be quickly pulled up. If necessary, the rest of the retraction can be done by rotations of the jack crank/handle 302. This is a much faster way to retract the jack to gain ground clearance for towing.

The handle/lever 336 may be pulled all the way up, or until the desired holes are aligned for inserting the pin 340 and clip 342. The pin 340 and clip 342 are then inserted to keep the telescoping jack foot 312 fully retracted.

Figure 27:
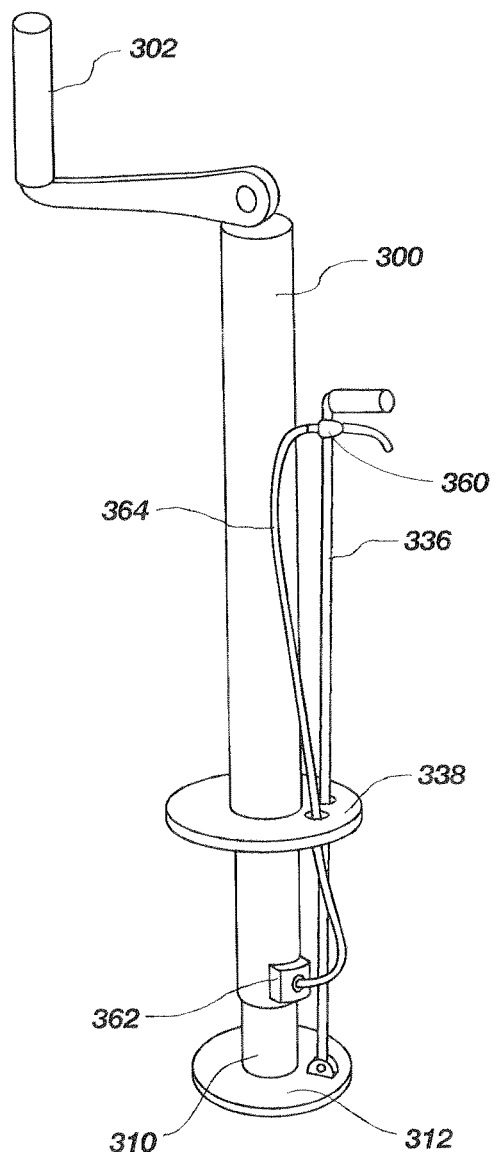
FIG. 27 depicts a view of one embodiment in accordance with the disclosure.
Figure 28:
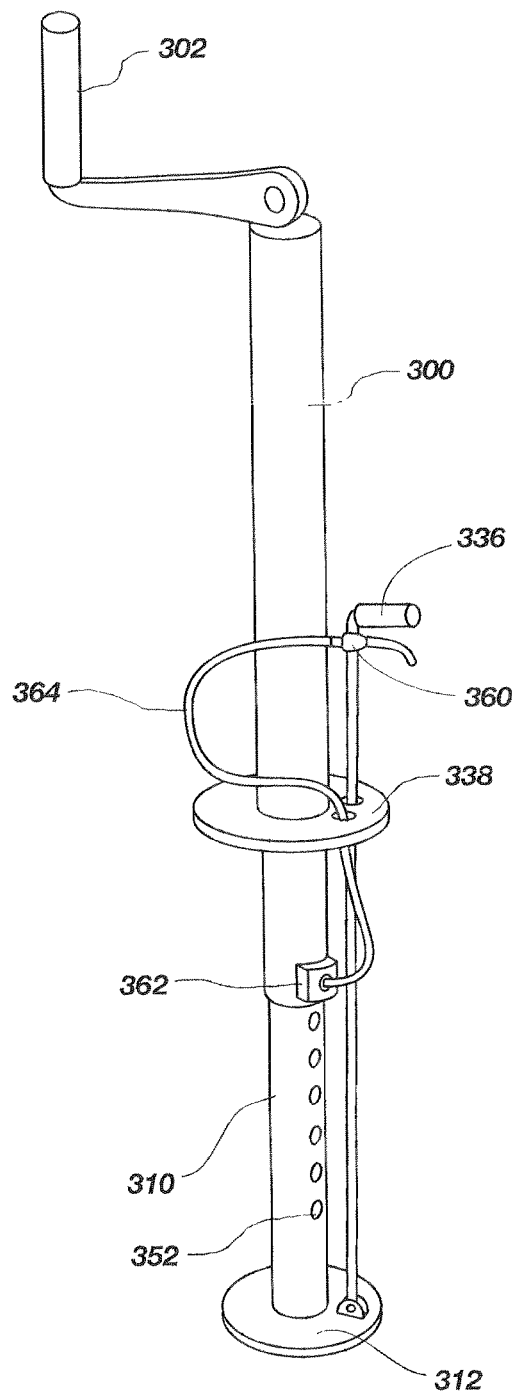
FIG. 28 depicts a view of one embodiment in accordance with the disclosure.
Figure 29:
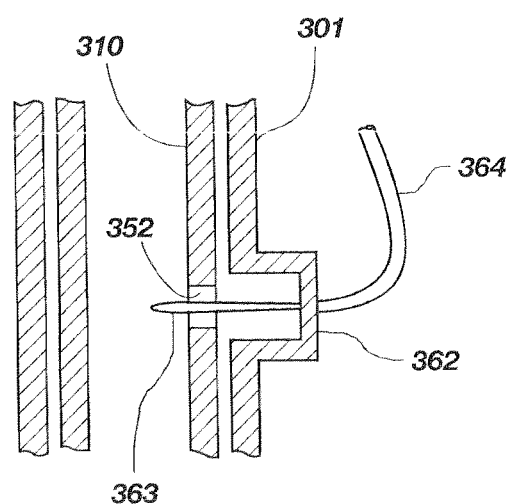
FIG. 29 depicts a cross-sectional view of the embodiment shown in FIGS. 27-28.

Referring specifically to FIGS. 27, 28, and 29 one embodiment may include a remote lock and release pin function. This enables a one-handed operation from a standing position. The embodiment may comprise a spring-biased pin 363 contained within a housing 362, that is biased to stay inserted into the holes 352 of the two telescoping members outer cylinder 301 and inner cylinder 310. There may also be a pull cable 364 in a sheath accompanied by a squeeze lever 360. To extend or retract the foot 312, the same hand that grasps the handle 336 will also squeeze the lever 360. The internal cable 364 will pull within the sheath, which causes remote disengagement of the spring-biased pin 363.

It will be understood that the components of the present disclosure may be manufactured using processes known to those skilled in the art. Moreover, the materials used to manufacture the components of the jack system may vary in accordance with suitable materials known in the art.

It will be appreciated that the structure and apparatus disclosed herein are merely examples of a means for adjusting the height of a trailer tongue more conveniently with respect to a tow vehicle, and it should be appreciated that any structure, apparatus or system for adjusting the height of a trailer tongue more conveniently with respect to a tow vehicle that performs functions the same as, or equivalent to, those disclosed herein are intended to fall within the scope of this application.

In accordance with the features and combinations described above, a useful apparatus for attaching a trailer to a tow vehicle may include:

a tongue attached to a trailer, said tongue having a jack for lifting and leveling the trailer;

said jack including; a handle; a jack post; and a foot portion for contacting the ground; said foot portion being movable to provide length of structure for adjusting the height of said tongue.

Additionally, in accordance with the features and combinations described above, a useful method for jacking a trailer may include:

positioning a jack foot from a contracted position to an un-contracted position; and actuating a user interface lowering the jack foot until loaded with the weight of the trailer.

In accordance with the features and combinations described above, a useful apparatus for jacking a trailer with an extendable and retractable jack post may include:

a jack foot, said jack foot having a surface engaging portion for engaging a surface;

the jack foot having at least one rigid support member extending upwardly from said surface engaging portion;

a pivot bolt mountable to said jack post;

a securing bolt mountable to said jack post;

at least one slot formed in the at least one rigid support member, said at least one slot for engaging the pivot bolt to thereby provide an axis of rotation for the jack foot;

at least one locking slot formed in an uppermost portion of the at least one rigid support member, said at least one locking slot being configured and adapted for slidably engaging said securing bolt to thereby prevent rotation of the jack foot around the axis of rotation; and a retracting device for applying a torque to the jack foot to thereby cause its rotation around the axis of rotation.

Additionally, in accordance with the features and combinations described above, a useful method for unhitching a trailer having an extendable and retractable jack post from a tow vehicle may include:

releasing a first locking mechanism to thereby allow a jack foot mounted on an end of the jack post to move from a storage position to a ground engaging position;

extending the jack post such that a ground engaging portion of the jack foot engages the ground; and applying a load to the jack foot to thereby cause an engagement of a second locking mechanism, said second locking mechanism preventing the jack foot from moving out of the ground engaging position.

Additionally, in accordance with the features and combinations described above, a useful method for hitching a trailer having an extendable and retractable jack post to a tow vehicle may include:

retracting the jack post such that a tongue hitch of the trailer engages a ball of the tow vehicle;

continuing to retract the jack post such that a ground engaging portion of a jack foot mounted on the jack post disengages the ground, said disengagement of the ground engaging portion of the jack foot causing an anti-rotational locking mechanism to become disengaged;

applying a torque to the jack foot to thereby cause the jack foot to move from a ground engaging position to a storage position; and locking the jack foot in the storage position.

Additionally, in accordance with the features and combinations described above, and in accordance with an understanding that alternatives and modifications thereof can be used to cause, provide or effectuate the methods contained herein including any methods described above and any methods described below, a useful method for hitching a trailer having an extendable and retractable jack post to a tow vehicle may include:

retracting the jack post such that a tongue hitch of the trailer engages a ball of the tow vehicle;

continuing to retract the jack post such that a ground engaging portion of a jack foot mounted on the jack post disengages the ground;

applying a torque to the jack foot to thereby cause the jack foot to move from a ground engaging position to a pivoted position relative to the jack post, said step of applying a torque being accomplished by a user pulling (or causing to be pulled) a retraction device in an upward direction.

In the above methods, the step of applying a torque may further include grasping a ring-handle and pulling it in an upward direction to thereby cause a retracting rod, cable or strap attached to the jack foot to pivot or rotate the jack foot relative to the jack post, into a disengaged position, which may include a storage position.

Additionally, in accordance with the features and combinations described above, a useful method for installing a jack foot onto an end of a jack post may include:

pivotally mounting the jack foot onto the end of the jack post such that the jack foot is operable between a ground engaging position and a storage position;

providing an anti-rotational locking mechanism to thereby secure the jack foot in the ground engaging position; and providing a retraction device for applying a torque to the jack foot to thereby allow a user to move the jack foot from the ground engaging position to the storage position.

Those having ordinary skill in the relevant art will appreciate the advantages provided by the features of the present disclosure. For example, it is a feature of the present disclosure to provide a trailer jack system that is simple in design and manufacture. Another feature of the present disclosure is to provide such a trailer jack system that makes attaching the tow vehicle to the trailer faster, easier and safer, especially in situations where assistance from another individual is not available. It is a further feature of the present disclosure, in accordance with one aspect thereof, to provide a trailer jack system that has improved vertical alignment mechanisms. It is another feature of the present disclosure to provide a jacking system that may be used with or incorporate a conventional hitch receiver. In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for lifting and leveling a trailer comprising:
   a height adjustment means in mechanical communication with a post having a foot;
   wherein said foot is rotatable relative to said post;
   an elongate handle extending from said foot;
   a locking engagement surface disposed on said foot;
   a pivot bolt rotatably attaching said foot to said post and in mechanical communication with a slot; and
   a securing bolt configured to communicate with the locking engagement surface when the foot is under load, such that said foot is secured to said post by the pivot bolt and by the securing bolt;
   wherein the elongate handle is coupled to said foot between the pivot bolt and a ground engaging surface of the foot.

2. The system of claim 1 wherein said slot is substantially parallel to said post when said foot is parallel with said post.

3. The system of claim 1 wherein the foot's own weight causes the system to unlock.

4. The system of claim 1 wherein the system is locked when the trailer's weight is resting on the foot.

5. The system of claim 1 wherein said handle comprises a retainer.

6. The system of claim 5 wherein said retainer is a cotter pin.

7. The system of claim 1 further comprising an electric motor for actuating said height adjustment means.

8. The system of claim 1 wherein said electric motor further comprises a control panel.

9. The system of claim 1 wherein the foot is larger at a bottom portion than at a top portion.

10. The system of claim 1 wherein the locking structure is configured to receive substantially the cross section of said securing bolt.

11. The system of claim 1, wherein the locking engagement surface forms an open notch in a terminal side edge of the foot.

12. A system for lifting and leveling a trailer comprising:
    a jack in mechanical communication with a jack post having a jack foot;
    said jack foot rotates relative to said jack post;
    an elongate handle extending from said jack foot;
    a slot and a locking structure disposed on said jack foot;
    a first bolt rotatably attaching said jack foot to said jack post and in mechanical communication with said slot; and
    a second bolt configured to communicate with said locking structure when the jack foot is under load;
    wherein said slot is substantially parallel to said jack post when said jack foot is parallel with said jack post;
    wherein the jack foot's own weight causes the system to unlock;
    wherein the system is locked when the trailer's weight is resting on the jack foot;
    wherein said handle comprises a retainer;
    wherein said retainer is a cotter pin;
    further comprising an electric motor for actuating said jack;
    wherein said electric motor further comprises a control panel;
    wherein the jack foot is larger at a bottom portion than at a top portion;
    wherein the locking structure is configured to receive substantially the cross section of said second bolt;
    wherein the elongate handle is coupled to said jack foot between the first bolt and a ground engaging surface of the jack foot.

13. The system of claim 12, wherein the locking structure comprises an open notch formed in a terminal side edge of the jack foot.

14. A system for lifting and leveling a trailer comprising:
    a height adjustment means in mechanical communication with a post having a foot;
    wherein said foot is rotatable relative to said post;
    a locking engagement surface disposed on said foot;
    a pivot bolt rotatably attaching said foot to said post and in mechanical communication with a slot; and
    a securing bolt configured to communicate with the locking engagement surface when the foot is under load, such that said foot is secured to said post by the pivot bolt and by the securing bolt;
    wherein the locking engagement surface forms an open notch in a terminal side edge of the foot.

15. A system for lifting and leveling a trailer comprising:
    a height adjustment means in mechanical communication with a post having a foot;
    wherein said foot is rotatable relative to said post, said foot having two opposing sidewalls that slant outwardly and away from each other in a proximal-to-distal direction in a lower half of said foot, said foot having a jack foot slot formed in each of said two opposing sidewalls such that a through-passage is thereby formed that extends through the entire foot from one of said sidewalls to the other of said sidewalls;
    an elongate handle extending from said foot;
    a locking engagement surface disposed on said foot;
    a pivot bolt rotatably attaching said foot to said post and in mechanical communication with the jack foot slot; and
    a securing bolt configured to communicate with the locking engagement surface when the foot is under load, such that said foot is secured to said post by the pivot bolt and by the securing bolt.

16. The system of claim 15, wherein the foot comprises a one-piece body formed by the two opposing sidewalls, and wherein the locking engagement surface forms an open notch in a terminal side edge of the foot.

17. The system of claim 16, wherein the elongate handle is coupled to said foot between the pivot bolt and a ground engaging surface of the foot.

* * * * *